US011917377B2

(12) United States Patent
Zhang et al.

(10) Patent No.: US 11,917,377 B2
(45) **Date of Patent: *Feb. 27, 2024**

(54) SOUND-OUTPUT DEVICE

(71) Applicant: Shenzhen SHOKZ Co., Ltd., Shenzhen (CN)

(72) Inventors: Lei Zhang, Shenzhen (CN); Junjiang Fu, Shenzhen (CN); Fengyun Liao, Shenzhen (CN); Xin Qi, Shenzhen (CN)

(73) Assignee: Shenzhen Shokz Co., Ltd., Shenzhen (CN)

( * ) Notice: Subject to any disclaimer, the term of this patent is extended or adjusted under 35 U.S.C. 154(b) by 108 days.

This patent is subject to a terminal disclaimer.

(21) Appl. No.: 17/362,972

(22) Filed: Jun. 29, 2021

(65) Prior Publication Data

US 2021/0409875 A1 Dec. 30, 2021

Related U.S. Application Data

(63) Continuation of application No. PCT/CN2019/125286, filed on Dec. 13, 2019.

(51) Int. Cl.
*H04R 3/00* (2006.01)
*H04R 1/02* (2006.01)
(Continued)

(52) U.S. Cl.
CPC ................. *H04R 3/00* (2013.01); *H04R 1/02* (2013.01); *H04R 1/2803* (2013.01); *H04R 3/12* (2013.01);
(Continued)

(58) Field of Classification Search
CPC .......... H04R 3/00; H04R 1/02; H04R 1/2803; H04R 3/12; H04R 9/025; H04R 25/50; H04R 2460/13
See application file for complete search history.

(56) References Cited

U.S. PATENT DOCUMENTS 11,343,619 B2 * 5/2022 Jespersgaard ........ H04R 25/552
2006/0262954 A1 11/2006 Lee et al.
(Continued)

FOREIGN PATENT DOCUMENTS

CN 1276142 A 12/2000
CN 101931837 A 12/2010
(Continued)

OTHER PUBLICATIONS

International Search Report of PCT/CN2019/125286 (dated Aug. 28, 2020).

*Primary Examiner* — Andrew L Sniezek
(74) *Attorney, Agent, or Firm* — FIDELI LAW PLLC

(57) ABSTRACT

The present application discloses a sound-output device, including a vibration speaker configured to generate a bone-conducted sound wave; and an air-conducted speaker configured to generate an air-conducted sound wave. The sound-output device further comprises a signal processing module configured to generate a control signal, wherein, the vibration speaker includes a vibration assembly electrically connected to the signal processing module to receive the control signal, and generate the bone-conducted sound wave based on the control signal, and the air-conducted speaker includes a housing coupled to the vibration assembly to generate the air-conducted sound wave based on the bone-conducted sound wave.

13 Claims, 37 Drawing Sheets

(51) Int. Cl.
*H04R 9/02* (2006.01)
*H04R 1/28* (2006.01)
*H04R 3/12* (2006.01)
*H04R 25/00* (2006.01)

(52) U.S. Cl.
CPC ............. *H04R 9/025* (2013.01); *H04R 25/50* (2013.01); *H04R 2460/13* (2013.01)

(56) References Cited

U.S. PATENT DOCUMENTS

| | | | |
|---|---|---|---|
| 2014/0056455 | A1 | 2/2014 | Sakaguchi |
| 2014/0185837 | A1 | 7/2014 | Kunimoto et al. |
| 2017/0180892 | A1 | 6/2017 | Hillbratt et al. |
| 2017/0238096 | A1 | 8/2017 | Nakagawa et al. |
| 2017/0280227 | A1 | 9/2017 | Huang |
| 2018/0288539 | A1 | 10/2018 | Bervoets |
| 2019/0075389 | A1 | 3/2019 | Jan |
| 2019/0342647 | A1 | 11/2019 | Mehra et al. |
| 2020/0037080 | A1 | 1/2020 | Biggs |

FOREIGN PATENT DOCUMENTS

| | | | | |
|---|---|---|---|---|
| CN | 102014328 | A | 4/2011 | |
| CN | 202721792 | U | 2/2013 | |
| CN | 204031403 | U | 12/2014 | |
| CN | 105007551 | A | 10/2015 | |
| CN | 205454090 | U | 8/2016 | |
| CN | 107005759 | A | 8/2017 | |
| CN | 206674151 | U | 11/2017 | |
| CN | 107948881 | A | 4/2018 | |
| CN | 108886645 | A | 11/2018 | |
| CN | 109068248 | A | 12/2018 | |
| CN | 109547891 | A | 3/2019 | |
| CN | 208798151 | U | 4/2019 | |
| CN | 209358770 | U | 9/2019 | |
| CN | 110493679 | A | 11/2019 | |
| EP | 2453676 | A1 | 5/2012 | |
| JP | 2006501756 | A | 1/2006 | |
| JP | 2018530205 | A | 10/2018 | |
| TW | 200539661 | A | 12/2005 | |
| TW | 201820891 | A | 6/2018 | |
| WO | WO2005096664 | A1 | 10/2005 | |
| WO | WO-2007083903 | A1 * | 7/2007 | ............. B06B 1/045 |
| WO | 2009/119989 | A | 10/2009 | |
| WO | 2015198683 | A1 | 12/2015 | |
| WO | WO2016103983 | A1 | 6/2016 | |
| WO | 2018079340 | A1 | 5/2018 | |
| WO | WO2018079340 | A1 | 5/2018 | |

* cited by examiner

SOUND-OUTPUT DEVICE

RELATED APPLICATION

This application is a continuation application of PCT application No. PCT/CN2019/125286, filed on Dec. 13, 2019, and the content of which is incorporated herein by reference in its entirety.

TECHNICAL FIELD

The present application relates to the field of acoustics, and in particular to a sound-output device.

BACKGROUND INFORMATION

New wearable devices with acoustic output functions are now emerging and quickly become popular. In particular, a listening mode in which an open ear (i.e., no acoustic device is inserted into the ear or covers the ear) is increasingly applied to wearable devices because of its advantages in the aspects of health, safety, and the like. The foregoing listening mode of such an open ear can be achieved by means of either air-conducted sound transmission, or bone-conducted sound transmission. However, the air-conducted sound transmission mode requires an acoustic device and a structure thereof of large volume, and may also cause a significant problem of external leakage of sound. The mode of bone-conducted sound transmission may produce relatively strong low frequency vibration, and thus may also cause a certain level of external leakage of sound. These problems have negatively affected the experience of this open ear listening method, limiting the application of this method.

Therefore, it is desirable to provide a sound-output device that has improvements in open ear listening effect and external leakage of sound.

BRIEF SUMMARY

A brief summary of the present application is set forth below to provide the basic understanding of certain aspects of the present application. It is understood that this section is not intended to identify key or critical parts of the present application, and is not intended to limit the scope of the present application. Its purpose is to present some concepts in a simplified form as a prelude to a more detailed description provided later.

The present application provides a sound-output device capable of generating and outputting bone-conducted sound waves and air-conducted sound waves. The device is able to achieve the combinations of different auditory and tactile stimuli by means of adjusting the acoustic properties (for example, phase, amplitude, frequency band) of the bone-conducted sound waves and air-conducted sound waves, thereby improving the sound quality, solving the problem of external leakage of sound, and enhancing the user's experience.

One aspect of the present application provides a sound-output device. The sound-output device includes a vibration speaker configured to generate a bone-conducted sound wave; and an air-conducted speaker configured to generate an air-conducted sound wave.

According to some embodiments of the present application, the sound-output device further comprises a signal processing module configured to generate a control signal, wherein, the vibration speaker includes a vibration assembly electrically connected to the signal processing module to receive the control signal, and generate the bone-conducted sound wave based on the control signal, and the air-conducted speaker includes a housing coupled to the vibration assembly to generate the air-conducted sound wave based on the bone-conducted sound wave.

Another aspect of the present application provides a sound-output device. The sound-output device includes a signal processing module configured to generate a control signal; a housing; a magnetic circuit system configured to generate a first magnetic field; a vibration plate connected to the housing; a coil connected to the vibration plate and electrically connected to the signal processing module to receive the control signal and generate a second magnetic field based on the control signal, the first magnetic field interacting with the second magnetic field to cause the vibration plate to generate a bone-conducted sound wave; and a membrane connected to the magnetic circuit system and the housing, the first magnetic field interacting with the second magnetic field to cause the membrane to generate an air-conducted sound wave.

Another aspect of the present application provides a sound-output device, comprising: a signal processing module configured to generate a control signal; a housing; a magnetic circuit system configured to generate a first magnetic field; a vibration plate connected to the housing; a coil connected to the vibration plate and electrically connected to the signal processing module to receive the control signal and generate a second magnetic field based on the control signal, the first magnetic field interacting with the second magnetic field to cause the vibration plate to generate a bone-conducted sound wave; and a membrane connected to the magnetic circuit system and the housing, the first magnetic field interacting with the second magnetic field to cause the membrane to generate an air-conducted sound wave.

The sound-output device of the present application can improve the sound quality, solve the problem of external leakage of sound, and enhance the user's experience.

BRIEF DESCRIPTION OF THE DRAWINGS

The present application can be better understood by referring to the description given below in conjunction with the accompanying drawings. The same or similar reference numerals are used to represent the same or similar components.

Figure 1:
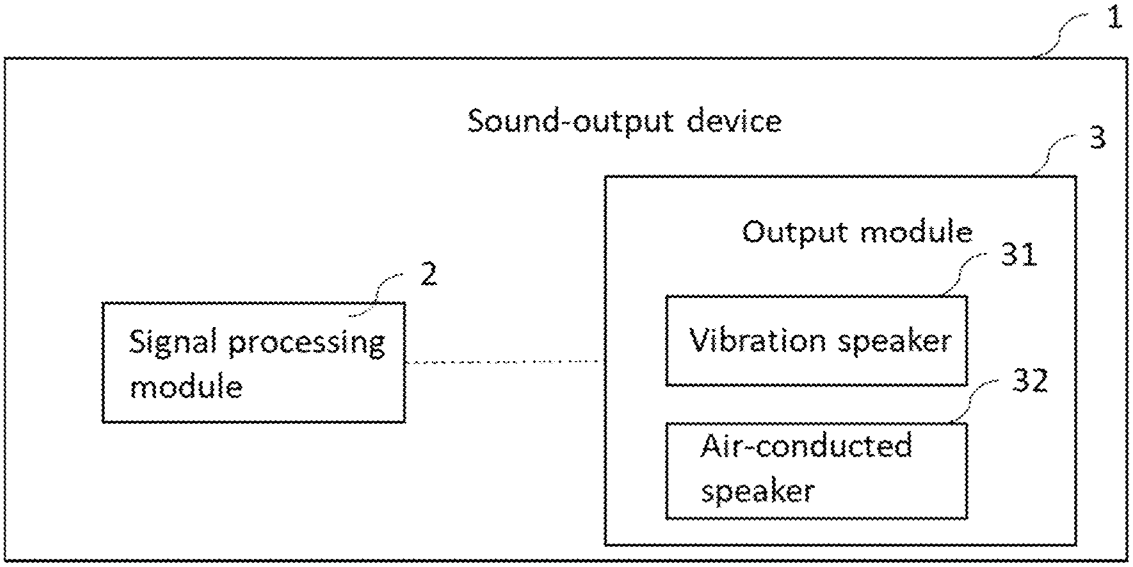
FIG. 1 shows a schematic diagram of a sound-output device provided in accordance with some embodiments of the present application.

Those skilled in the art should understand that the elements in the figures are only shown for simplicity and clarity, and they are not necessarily drawn to scale.

DETAILED DESCRIPTION

The specific embodiments of the present application will be further described in detail below with reference to the accompanying drawings and embodiments. The following embodiments are intended to illustrate the application, but are not intended to limit the scope of the present application.

Exemplary embodiments of the present application will be described hereinafter with reference to the accompanying drawings. For the sake of clarity and conciseness, not all features of an actual embodiment are described in the following description. In addition, it should also be noted that, in order to avoid obscuring the present application by unnecessary details, only the device structure and/or processing steps closely related to the solutions according to the present application are shown in the drawings, and other details that have little to do with this application will be omitted.

In view of the foregoing, it will be understood by those skilled in the art that although not explicitly stated herein, those skilled in the art will understand that the present application is intended to cover various changes, improvements and modifications of the embodiments. These changes, modifications, and improvements are intended to be made by the present disclosure and are within the spirit and scope of the exemplary embodiments of the present disclosure.

It will be understood that the term "and/or" used herein includes any or all combinations of one or more of the associated listed items. It will be understood that when an element is referred to as "connected" or "coupled" to another element, it can be directly connected or coupled to the other element or through an intermediate element.

Similarly, when an element such as a layer, a region or a substrate is referred to as being "on" another element, it may be directly on the other element or an intermediate element may be present therebetween. In contrast, the term "directly" means that there is no intermediate element. It is also to be understood that the terms "comprise," "comprising," "include," and "including", when used herein, indicate the existence of the recited features, integers, steps, operations, components and/or components, but the presence or addition of one or more other features, integers, steps, operations, components, components and/or combinations thereof are not excluded.

It should also be understood that although the terms first, second, third, etc. may be used herein to describe various elements, these elements should not be limited by these terms. These terms are only used to distinguish one element from another. Thus, a first element in some embodiments could be termed a second element in other embodiments without departing from the teachings of the present invention. The same reference numbers or the same reference numerals will be used throughout the specification.

Further, the exemplary embodiments are described by referring to a cross-sectional illustration and/or a planar illustration as an idealized exemplary illustration. Thus, differences from the shapes illustrated may be foreseeable due to, for example, manufacturing techniques and/or tolerances. Therefore, the exemplary embodiments should not be construed as limited to the shapes of the regions illustrated herein, but should include variations in the shapes resulting from, for example, manufacturing. For example, an etched region illustrated as a rectangle will typically have rounded or curved features. The regions illustrated in the figures are, therefore, not intended to illustrate the actual shape of the region of the device or the scope of the exemplary embodiments.

FIG. 1 shows a schematic diagram of a sound-output device provided in accordance with some embodiments of the present application. The sound-output device 1 may include a signal processing module 2 and an output module 3.

The signal processing module 2 may be configured to receive an initial sound signal from a signal source, process the initial sound signal, and then output a corresponding control signal. The initial sound signal may be any analog sound signal acquired directly from the external environment, for example, an analog signal (electronic signal or radio signal) obtained by directly acquiring any perceivable mechanical vibration conducted by air or bone. It may be any digital or analog signal (electronic signal or radio signal) converted from a sound signal imported from an external device. The output module 3 may be configured to output a corresponding bone-conducted sound wave and/or air-conducted sound wave according to the control signal output by the signal processing module 2. In the present application, a bone-conducted sound wave refers to a sound wave that is transmitted to the ear by mechanical vibration through the bone, and the air-conducted sound wave refers to a sound wave that is transmitted to the ear by mechanical vibration through the air. The low frequency may refer to a frequency band of substantially 20 Hz to 150 Hz, the medium frequency may refer to a frequency band of substantially 150 Hz to 5 kHz, the high frequency band may refer to a frequency band of substantially 5 kHz to 20 kHz, the low-medium frequency may refer to a frequency band of substantially 150 Hz to 500 Hz, and the medium-high frequency may refer to a frequency band of substantially 500 Hz to 5 kHz. A person of ordinary skill in the art will appreciate that the distinction of the above-described frequency bands is only given as an example for a general range. The definition of the above frequency bands may be changed in different industries, different application scenarios and different classification standards. For example, in other application scenarios, the low frequency refers to a frequency band of substantially 20 Hz to 80 Hz, the medium-low frequency may refer to a frequency band substantially between 80 Hz and 160 Hz, the medium frequency may refer to a frequency band of substantially 160 Hz to 1280 Hz, the medium-high frequency may refer to a frequency band of substantially 1280 Hz to 2560 Hz, and the high frequency band may refer to a frequency band of substantially 2560 Hz to 20 kHz.

The output module 3 may further include a vibration speaker 31 and an air-conducted speaker 32. The air-conducted speaker 32 may refer to a speaker that outputs air-conducted sound wave, whereas the vibration speaker 31 may refer to a speaker that outputs solid-medium-conducted sound wave (e.g., a bone-conducted soundwave). The vibration speaker 31 may be coupled to the signal processing module 2 and configured to generate a bone-conducted sound wave according to a control signal. The air-conducted speaker 32 may be coupled to the signal processing module 2 and configured to generate an air-conducted sound wave according to a control signal. The vibration speaker 31 and the air-conducted speaker 32 may be two separate functional devices or may be the parts of a single device capable of implementing multiple functions. In some embodiments, the signal processing module 2 may be integrated with or formed integrally with the vibration speaker 31 and the air-conducted speaker 32.

Figure 2:
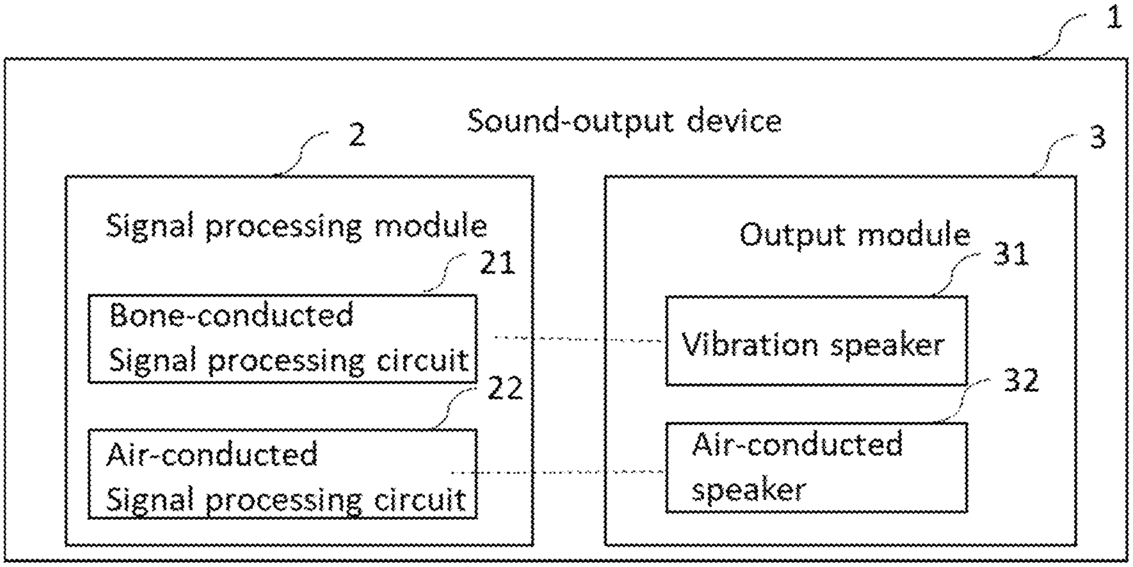
FIG. 2 shows another schematic diagram of a sound-output device provided in accordance with some embodiments of the present application.

FIG. 2 shows a schematic diagram of a sound-output device provided in accordance with some embodiments of the present application. The embodiment shown in FIG. 2 is similar to that shown in FIG. 1, with the following differences.

The signal processing module 2 may further include a bone-conducted signal processing circuit 21 and an air-conducted signal processing circuit 22. Here, the air-conducted signal may refer to signals related to and/or resulting the output of the air-conducted sound wave; and the bone-conducted signal may refer to electrical signals related to and/or resulting the output of the bone-conducted sound wave. The bone-conducted signal processing circuit 21 may be configured to receive an initial sound signal from the signal source, process the initial sound signal, and output a corresponding bone-conducted control signal. The air-conducted signal processing circuit 22 may be configured to receive an initial sound signal from the signal source, process the initial sound signal, and output a corresponding air-conducted control signal. Here, the air-conducted control signal may refer to an electrical signal that controls generation and output of the air-conducted sound wave; and the bone-conducted control signal may refer to an electrical signal that controls generation and output of the bone-conducted sound wave.

The output module 3 may further include a vibration speaker 31 and an air-conducted speaker 32. The vibration speaker 31 may be coupled to the signal bone-conducted signal processing circuit 21 and configured to generate a bone-conducted sound wave according to the bone-conducted control signal. The air-conducted speaker 32 may be coupled to the air-conducted signal processing circuit 22 and configured to generate an air-conducted sound wave according to the air-conducted control signal. In some embodiments, the bone-conducted signal processing circuit 21 may be integrated with or formed integrally with the vibration speaker 31. In some embodiments, the air-conducted signal processing circuit 22 may be integrated with or formed integrally with the air-conducted speaker 32.

In order to adjust the output characteristics (such as, frequency, phase, amplitude, etc.) of the bone-conducted sound wave and the air-conducted sound wave, the corresponding control signals may be processed in the signal processing module 2 such that the output air-conducted sound waves and bone-conducted sound waves respectively contain certain specific frequency components. It is also possible to arrange and optimize the structures of the component or the arrangement of the components in the output module 3 to allow the output air-conducted sound waves and bone-conducted sound wave to respectively contain certain specific frequency components.

In the case where the signal processing module 2 is adjusted to change the properties of the output sound wave, a plurality of filters/filter banks may be provided to process the input signals to output signals containing different frequency components, which are then output to the corresponding output module for sound (air-conducted) or vibration (bone-conducted) output. The filters/filter banks may include, but are not limited to, analog filters, digital filters, passive filters, active filters, and the like. In some embodiments, dynamic range control (DRC), and time domain processing such as time delay and reverberation may be set to further increase the richness of sound and enhance the experience of sound. In some embodiments, an active sound leakage reduction module may be provided. In some embodiments, a feedback-free mode may be adopted, that is, the sound field information is not fed back through a reference microphone, the output module 3 may directly output the sound wave of inverted phase in a specific frequency band, which will be superimposed with the leakage sound wave so as to cancel the leakage sound wave. In some embodiments, a feedback mode may be adopted, that is, a reference microphone is placed in the sound field to obtain sound field information at that location to provide feedback to the signal processing module so as to facilitate it to adjust the sound signal of inverted phase, and finally the sound pressure of the sound leakage is reduced. In some embodiments, a beam forming module may be provided to synthesize the output sound into a sound beam by means of controlling the amplitude and phase of the sound waves from the bone-conducted or air-conducted units (the vibration speaker 31 and the air-conducted speaker 32) in the sound-output device 1. The sound beam may be in a fan shape with a certain radiation angle, and may be propagated in an artificially controlled direction so as to achieve a corresponding directivity, thereby obtaining a maximum sound pressure level near the human ear, and at the same time, the sound pressure level is relatively small at other positions in the sound field. Thus the sound leakage is reduced. In some embodiments, the sound-output device 1 may utilize 3D sound field reconstruction or local sound field control techniques to reconstruct an ideal, stereoscopic sound field, thereby providing a better sound field immersive experience.

Figure 3:
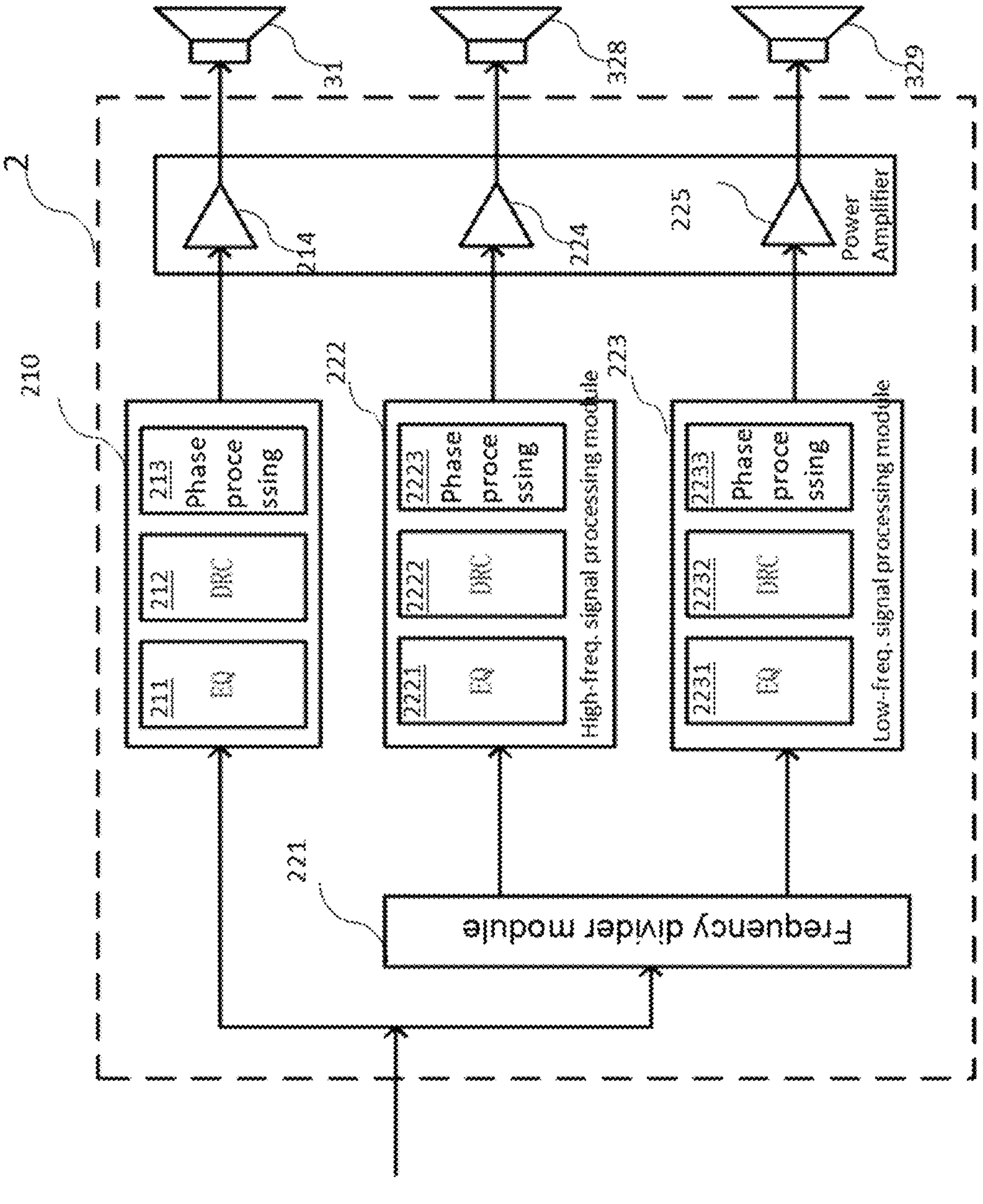
FIG. 3 shows another schematic diagram of a sound-output device provided in accordance with some embodiments of the present application.

FIG. 3 shows a schematic diagram of a sound-output device provided in accordance with some embodiments of the present application. As shown in this figure, the sound-output device 1 may include a signal processing module 2, a vibration speaker 31, and an air-conducted speaker 32. The signal processing module 2 may include a bone-conducted signal processing circuit 21 and an air-conducted signal processing circuit 22. The air-conducted speaker 32 may include a high frequency air-conducted speaker 328 and a low frequency air-conducted speaker 329.

The bone-conducted signal processing circuit 21 may include a full frequency signal processing module 210. The full frequency signal processing module 210 may be configured to generate a bone-conducted output signal based on an initial sound signal (for example, a signal acquired from an external sound source, or a signal imported from an external device). The full frequency signal processing module 210 may include an equalizer 211, a dynamic range controller 212, a phase processor 213, and a first power amplifier 214. The equalizer 211 may be configured to perform respective gain or attenuation processing on a particular frequency band for an input signal (for example, the initial sound signal). The dynamic range controller 212 may be configured to compress and amplify an input signal, for example, to make the sound softer or louder. The phase processor 213 may be configured to adjust the phase of the input signal. The power amplifier 204 may be configured to amplify the amplitude of the input signal. In some embodiments, the initial sound signal may be processed by the equalizer 211, the dynamic range controller 212, the phase processor 213, and/or the first power amplifier 214 to form the bone-conducted control signal for controlling the vibration speaker 31 to produce bone-conducted sound waves.

An equalizer is a device to adjust specific frequencies of sound. A dynamic range controller (DRC) is a device to conduct dynamic range control of a signal, where the dynamic range control is an adaptive adjustment of the dynamic range of the signal, and the dynamic range of a signal is the logarithmic ratio of maximum to minimum signal amplitude specified in dB. One can use dynamic range control to match an audio signal level to its environment, so as to protect an AD converter from overload. A phaser is an electronic sound processor used to filter a signal by creating a series of peaks and troughs in the frequency spectrum. The position of the peaks and troughs of the waveform being affected is typically modulated so that they vary over time, creating a sweeping effect.

The air-conducted signal processing circuit 22 may include a frequency divider module 221, a high frequency signal processing module 222, a low frequency signal processing module 223, a second power amplifier 224, and a third power amplifier 225. The frequency divider module 221 may be configured to decompose the initial signal from a sound source into a high frequency signal component and a low frequency signal component. In some embodiments, the frequency divider module 221 may also be configured to decompose the initial sound signal into signal components of three or more various frequency bands. The high frequency signal processing module 222 may be coupled to the frequency divider module 221 and configured to generate a high frequency output signal based on the high frequency signal component, the high frequency output signal is then amplified by the second power amplifier 224 to become a high frequency air-conducted control signal for controlling the high frequency air-conducted speaker 328 to generate high frequency air-conducted sound waves. In some embodiments, the high frequency signal processing module 222 may include an equalizer 2221, a dynamic range controller 2222, and a phase processor 2223. The low frequency signal processing module 223 may be coupled to the frequency divider module 221 and configured to generate a low frequency output signal based on the low frequency signal component, the low frequency output signal is then amplified by the third power amplifier 225 to become a low frequency air-conducted control signal for controlling the low frequency air-conducted speaker 329 to generate low frequency air-conducted sound waves. In some embodiments, the low frequency signal processing module 223 may include an equalizer 2231, a dynamic range controller 2232, and a phase processor 2233.

With the signal processing module 2 of the above embodiments, the low frequency may be enhanced and the high frequency leakage may be reduced. In some open binaural sound devices, such as bone-conducted headphones, there are often problems of low frequency sound shortage and high frequency sound leakage. In order to solve the foregoing problems, the sound-output device 1 may employ a vibration output device (for example, a vibration speaker) to output a full frequency band vibration or a bone-conducted sound (or a vibration with attenuated low frequency in order to reduce low frequency vibration discomfort), thereby sounds can be heard by people through bone-conducted or another manner. At the same time, the sound-output device 1 may output an air-conducted sound wave using an air-conducted output device (for example, an air-conducted speaker). The low frequency component of the air-conducted sound wave may be used to enhance the user's low frequency sound experience, and the high frequency component may be used to reduce the high frequency sound leakage, i.e., the high frequency of the air-conducted sound wave component may serve as silencing frequency sound wave to at least cancel part of the high frequency component of the bone-conducted sound wave. At the same time, a frequency divider module may be provided to divide the sound signal into a high frequency signal and a low frequency signal. The high frequency signal may be processed by the high frequency signal processing module for amplitude and phase, so that it has the amplitude and phase capable of cancelling the high frequency sound leakage. The low frequency signal may be processed by the low frequency signal processing module for amplitude and phase, so that it has the amplitude and phase capable of enhancing the low frequency sound effect. After the signal processing, the high frequency air-conducted control signal and the low frequency air-conducted control signal may be combined to form an air-conducted control signal, next after being processed by the power amplifier, the air-conducted sound wave may be output by the air-conducted speaker. Its high frequency component is able to cancel the leakage sound generated by the vibration speaker, and its low frequency component is able to enhance the low frequency sound.

Figure 4:
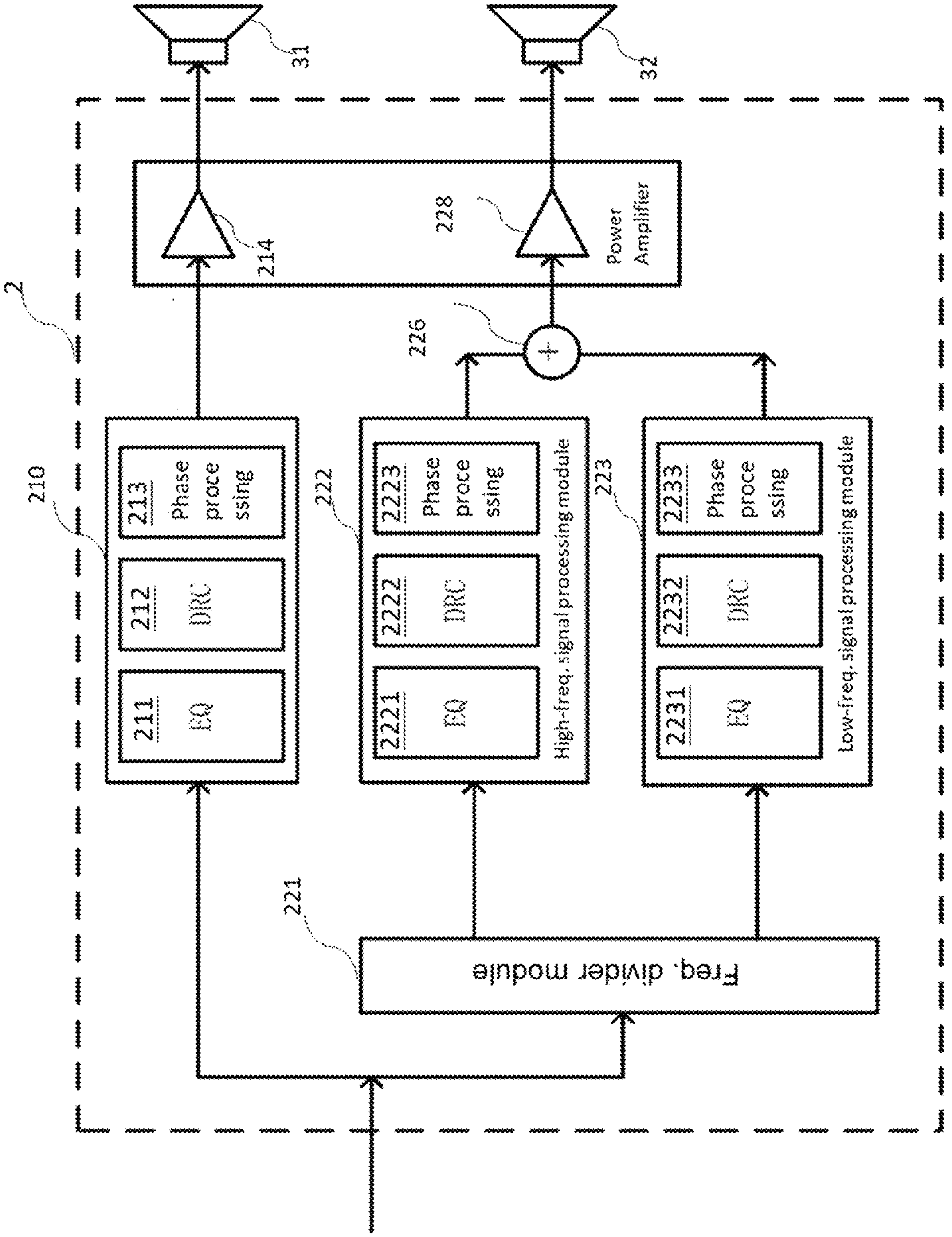
FIG. 4 shows another schematic diagram of a sound-output device provided in accordance with some embodiments of the present application.

FIG. 4 shows a schematic diagram of a sound-output device provided in accordance with some embodiments of the present application. The embodiment shown in FIG. 4 is similar to that shown in FIG. 3, except that in the embodiment shown in FIG. 4, the air-conducted signal processing circuit 22 further includes a signal synthesis module 226. The signal synthesis module 226 may be coupled to the high frequency signal processing module 222 and the low frequency signal processing module 223, and configured to synthesize the high frequency output signal and the low frequency output signal into an air-conducted output signal. The air-conducted output signal may be amplified to become the air-conducted control signal through a fifth power amplifier 228 for controlling the air-conducted speaker 32 to generate air-conducted sound waves.

Figure 5:
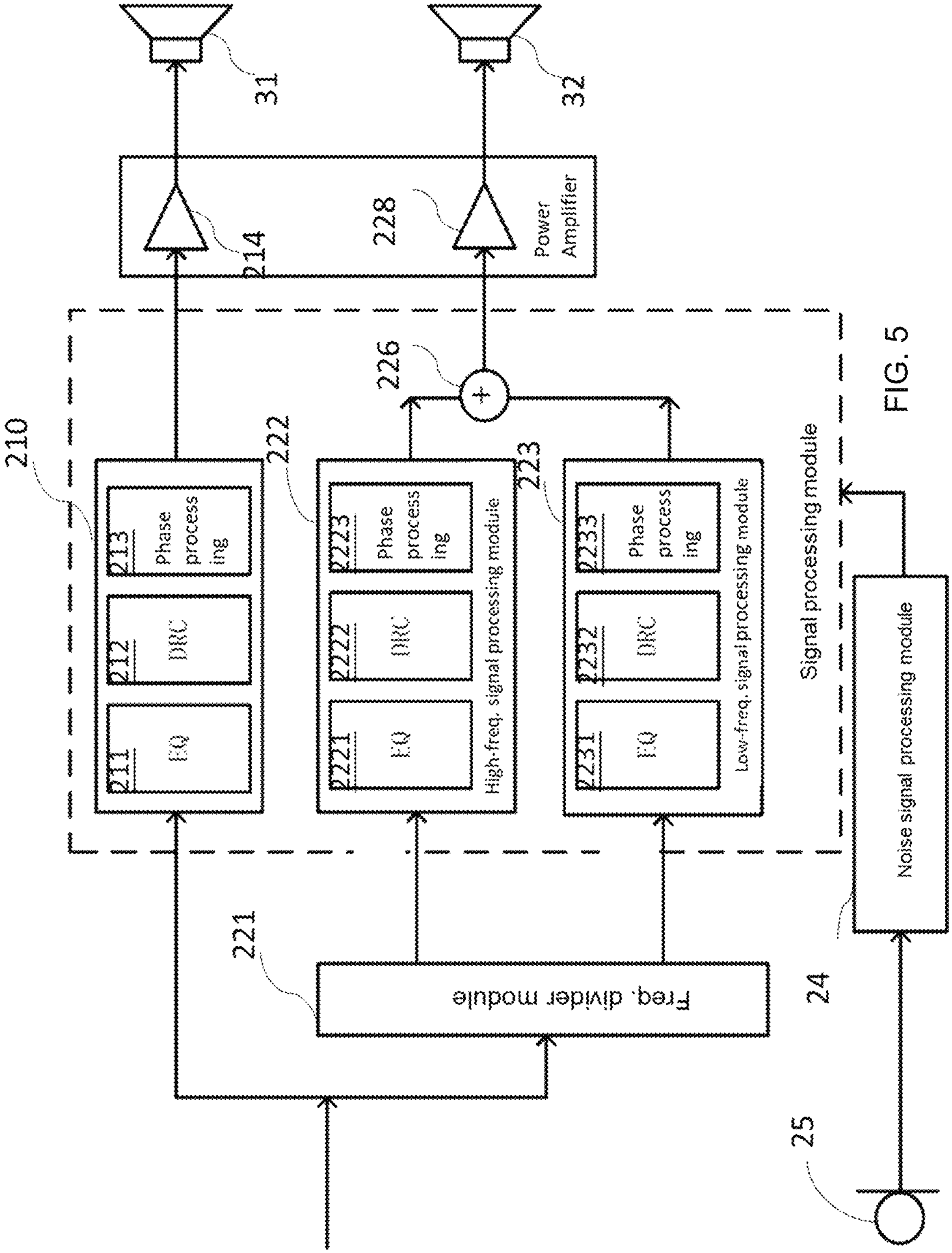
FIG. 5 shows another schematic diagram of a sound-output device provided in accordance with some embodiments of the present application.

FIG. 5 shows a schematic diagram of a sound-output device provided in accordance with some embodiments of the present application. The embodiment shown in FIG. 5 is substantially similar to that shown in FIG. 4, except that in the embodiment shown in FIG. 5, the signal processing module 2 may further include a noise signal processing module 24 and a first microphone 25. The noise signal processing module 24 may be coupled to the first microphone 25 and the air-conducted signal processing circuit 22. The first microphone 25 may be configured to acquire ambient noise at a particular location (for example, near a signal source) and output a noise signal. The noise signal processing module 24 may be configured to receive the noise signal and to perform noise reduction with the air-conducted output signal based on the noise signal. The noise-reduced air-conducted control signal is then processed through the power amplifier and then output through the air-conducted speaker so as to realize the technical effect of noise reduction in a specific region.

Figure 6:
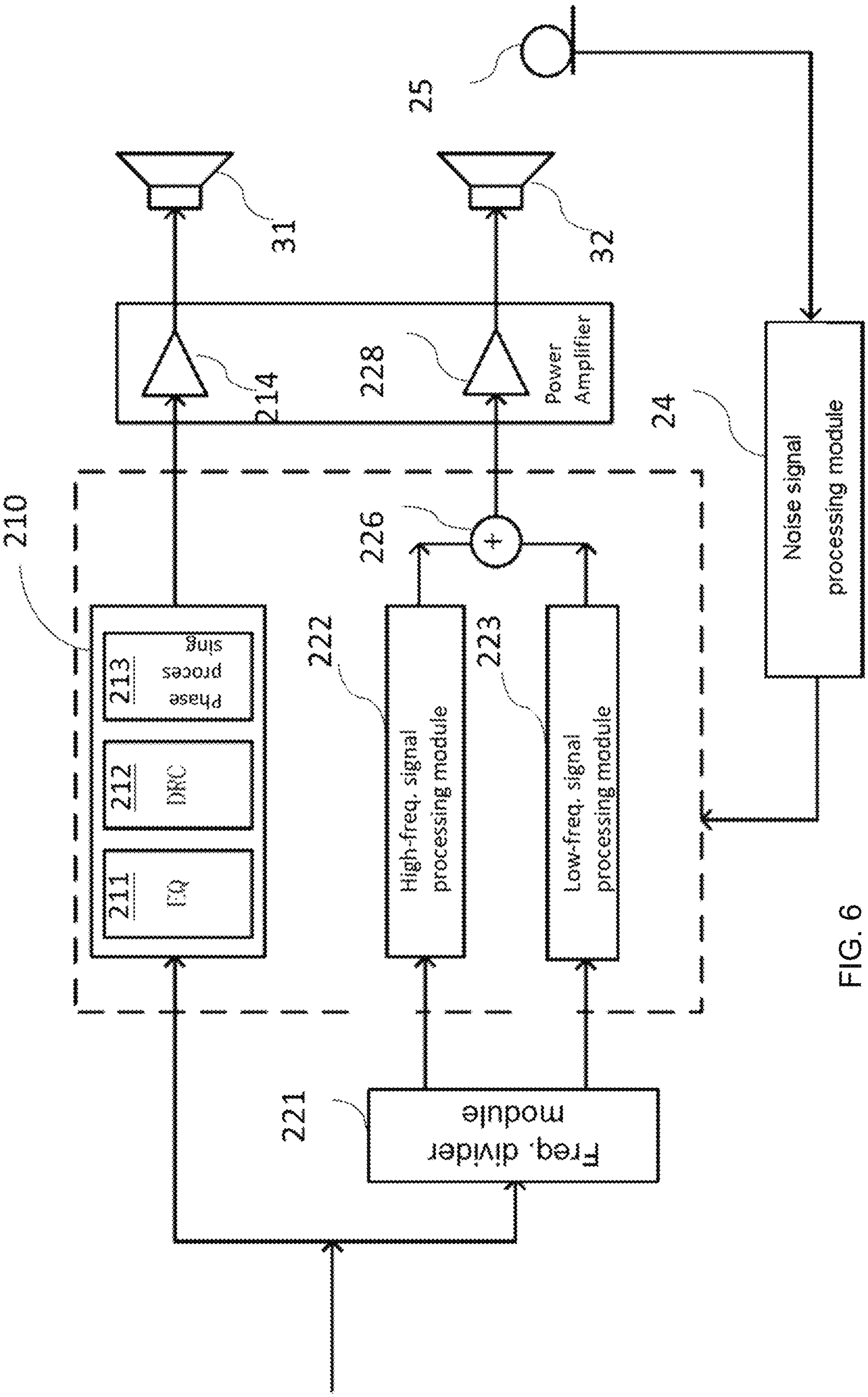
FIG. 6 shows another schematic diagram of a sound-output device provided in accordance with some embodiments of the present application.

FIG. 6 shows a schematic diagram of a sound-output device provided in accordance with some embodiments of the present application. The embodiment shown in FIG. 6 is substantially similar to that shown in FIG. 5, except that in the embodiment shown in FIG. 6, the first microphone 25 may be configured to collect the sound signal of a region to be noise-reduced (for example, a region near the air-conducted speaker 32), and output an error signal (for example, for noise control). The noise signal processing module 24 may be configured to receive the error signal and perform noise reduction with the air-conducted output signal based on the error signal so as to further adjust the air-conducted sound signal and achieve noise control for a particular region.

Figure 7:
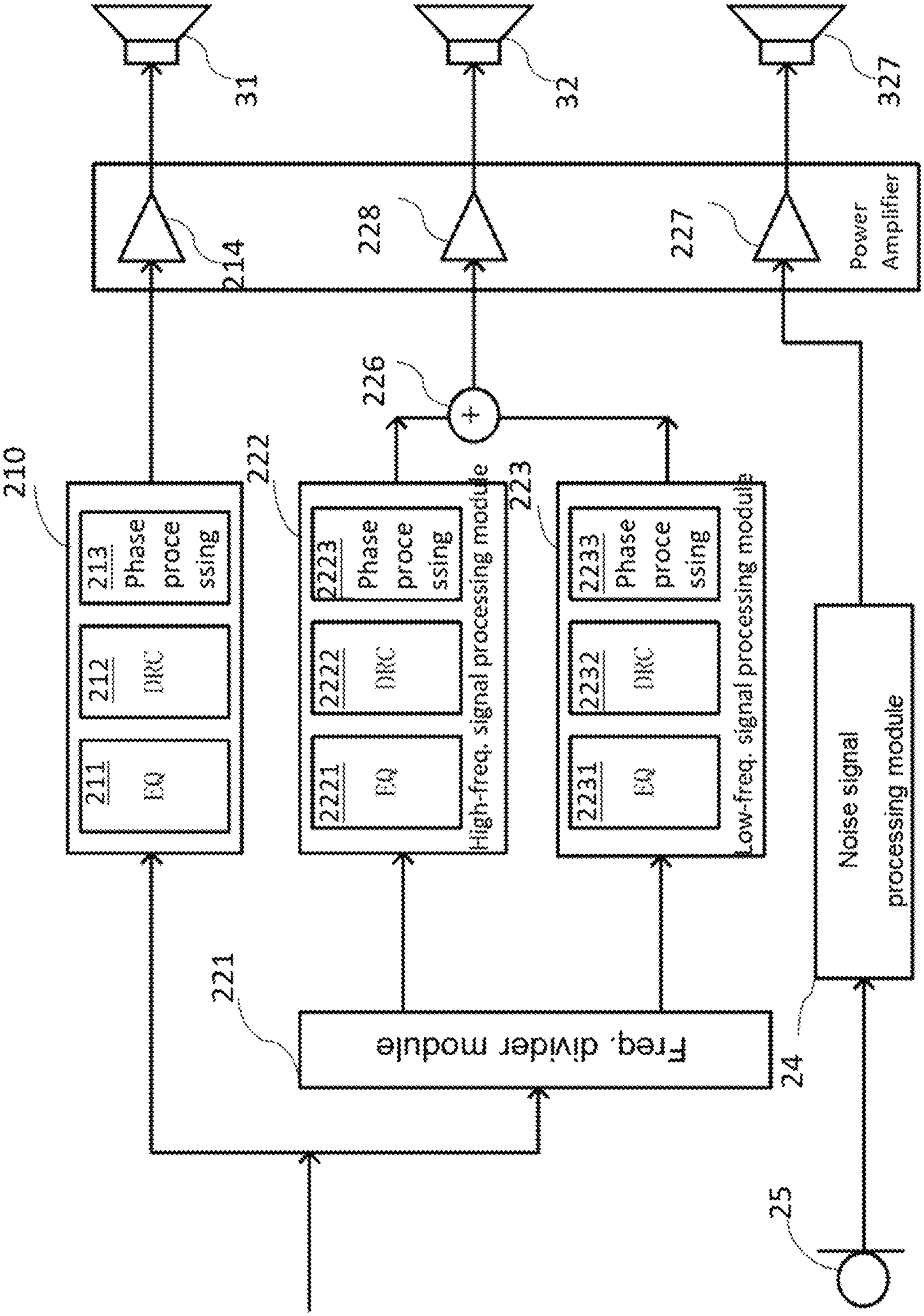
FIG. 7 shows another schematic diagram of a sound-output device provided in accordance with some embodiments of the present application.

FIG. 7 shows a schematic diagram of a sound-output device provided in accordance with some embodiments of the present application. The embodiment shown in FIG. 7 is substantially similar to that shown in FIG. 5, except that in the embodiment of FIG. 7, the noise signal processing module 24 is not coupled to the air-conducted signal processing circuit 22, but is coupled to an independent fourth power amplifier 227. The noise reduction signal generated by the noise signal processing module 24 passes through the fourth power amplifier 227 and then may output a noise reduction sound through a separate auxiliary air-conducted speaker 327, it may interact with the sounds outputted by other modules to active noise control in a specific region.

Figure 8:
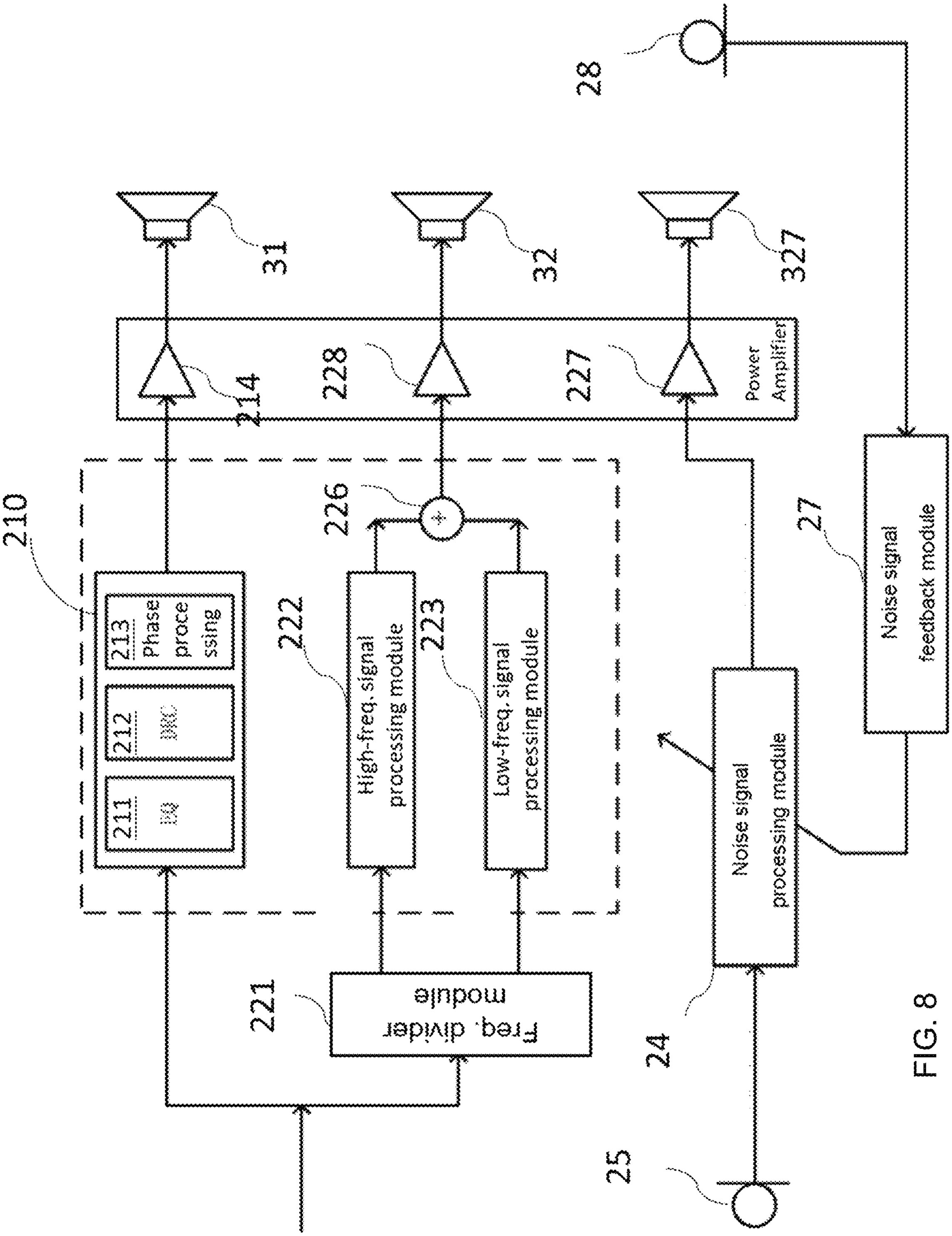
FIG. 8 shows another schematic diagram of a sound-output device provided in accordance with some embodiments of the present application.

FIG. 8 shows a schematic diagram of a sound-output device provided in accordance with some embodiments of the present application. The embodiment shown in FIG. 8 is substantially similar to that shown in FIG. 7, except that in the embodiment shown in FIG. 8, the signal processing module 2 may further include a noise signal feedback module 27 and a second microphone 28. The second microphone 28 may be configured to acquire a sound signal of a region to be noise-reduced (for example, a region near the air-conducted speaker 32) and output an error signal (for example, for noise control). The noise signal feedback module 27 may be coupled to the noise signal processing module 24, and configured to receive the error signal and generate a feedback signal based on the error signal. The noise signal processing module 24 may be configured to generate a noise reduction signal based on the noise signal and the feedback signal so as to perform noise reduction with the air-conducted output signal. The noise reduction signal can be output by the auxiliary air-conducted speaker 327 through the fourth power amplifier 227 so as to achieve noise control for a specific region. The noise control is thus implemented by combining two modes of feedforward and feedback.

Figure 9:
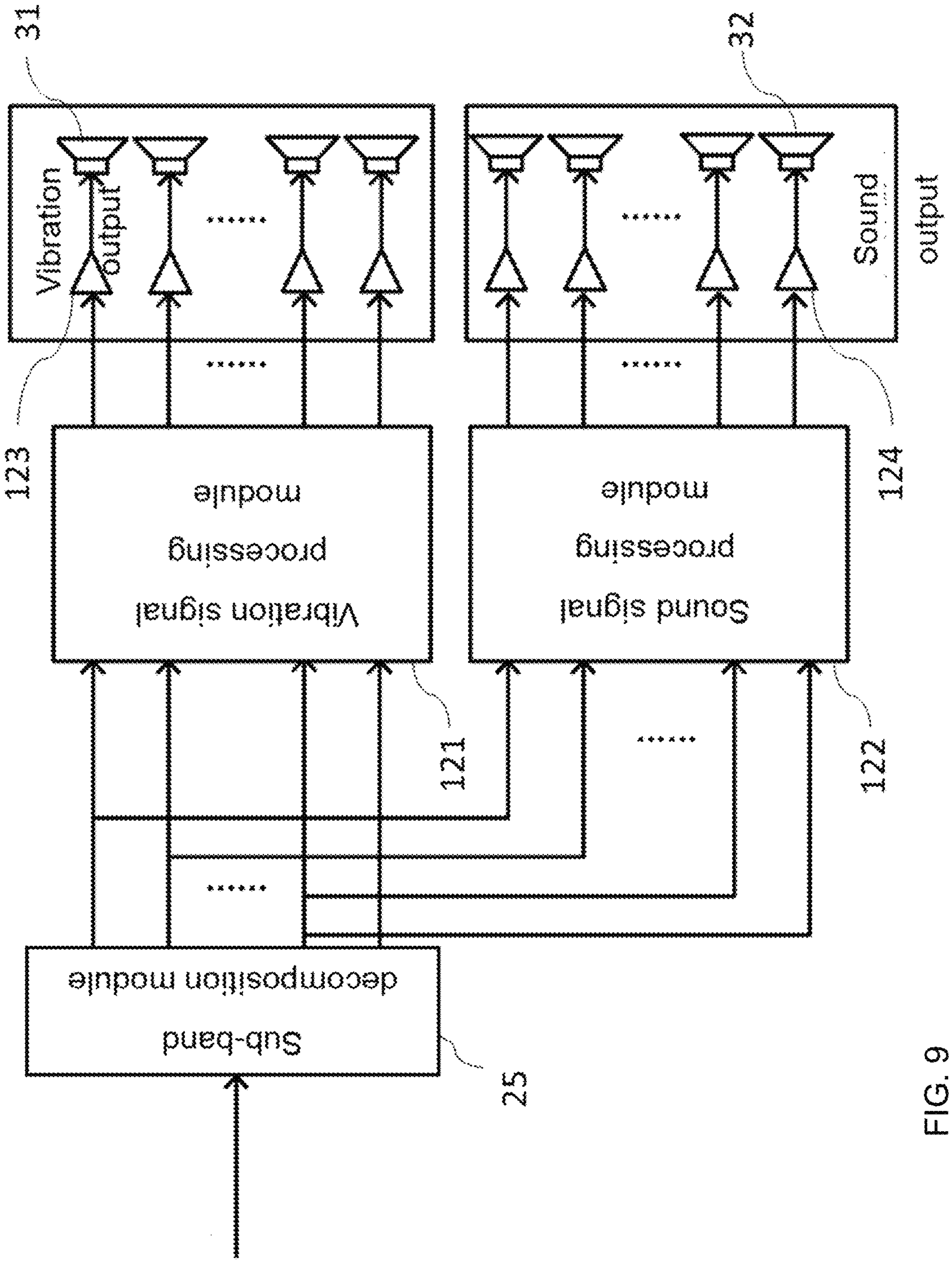
FIG. 9 shows another schematic diagram of a sound-output device provided in accordance with some embodiments of the present application.

FIG. 9 shows a schematic diagram of a sound-output device provided in accordance with some embodiments of the present application. The signal processing module 2 may include a sub-band decomposition module 120, a vibration signal processing module 121, a sound signal processing module 122, a plurality of first power amplifiers 123, and a plurality of second power amplifiers 124. The sub-band decomposition module 120 may be configured to decompose the initial sound signal into a plurality of signal components, where the plurality of signal components is respectively located in different frequency bands. The vibration signal processing module 121 may be configured to generate a plurality of bone-conducted output signals according to the plurality of signal components, and the plurality of bone-conducted output signals may be respectively located within the different frequency bands. The sound signal processing module 122 may be configured to generate a plurality of air-conducted output signals according to the plurality of signal components, where the plurality of air-conducted output signals is respectively located within the different frequency bands. A plurality of first power amplifiers 123 may be coupled to the vibration signal processing module 121 and configured to respectively amplify the plurality of bone-conducted output signals into bone-conducted control signals in respective frequency bands. A plurality of second power amplifiers 124 may be coupled to the sound signal processing module 122 and configured to amplify the plurality of air-conducted output signals into air-conducted control signals in respective frequency bands. The sound-output device 1 may include a plurality of vibration speakers 31 and a plurality of air-conducted speakers 32. The plurality of vibration speakers 31 are coupled to the plurality of first power amplifiers 123 in a one-to-one correspondence and respectively generate bone-conducted sound waves within the respective frequency bands based on the bone-conducted control signals within the respective frequency bands. The plurality of air-conducted speakers 32 may be coupled to the plurality of second power amplifiers 124 in a one-to-one correspondence and respectively generate air-conducted sound waves within the respective frequency bands based on the air-conducted control signals within the respective frequency bands.

According to the foregoing embodiments, the output of vibration and sound may be respectively processed for different frequency bands, and the processed sub-band signals may be output through corresponding vibration speakers or sound output modules through the power amplifier so as to achieve the effect that the bone-conducted sound wave and then air-conducted sound wave are output in different frequency bands. In some embodiments, the processed sub-band signals may also be synthesized and then output through a power amplifier(s) and corresponding one or more vibration speakers and air-conducted speakers to achieve a corresponding effect.

In an embodiment in which the characteristics of the output sound wave may be changed by adjusting the output module 3, the structures of the vibration speaker 31 (that is, the vibration output module) and the air-conducted speaker 32 (that is, the sound output module) may be separately adjusted to allow the output bone-conducted sound waves (that is, vibrations) and air-conducted sound waves (that is, sounds) to contain specific frequency components.

Figure 10:
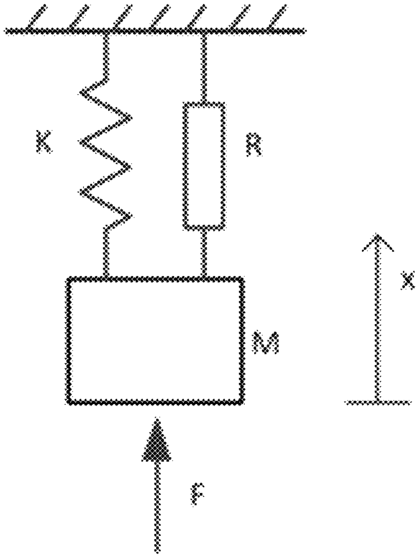
FIG. 10 shows a schematic diagram of a resonant system provided in accordance with some embodiments of the present application.

FIG. 10 shows a schematic diagram of a resonant system provided in accordance with some embodiments of the present application. The resonant system may be described using a mass spring damping model, and a more complex resonant system can be considered as multiple mass spring damping systems in a series or parallel connection. As shown in FIG. 2, the motion of the system can be described by the following differential equation:

$$M\ddot{x}+R\dot{x}+Kx=F$$

where, M is the system mass, R is the system damping, K is the system elastic modulus, F is the driving force, and x is the system displacement. Solving the above equation gives the system resonant frequency as follows:

$$f_0 = \frac{1}{2\pi}\sqrt{\frac{K}{M}}$$

The frequency bandwidth is calculated at the half power point, and the system quality factor Q is:

$$Q = \frac{\sqrt{MK}}{R}$$

In the case where a plurality of resonant systems exists, the vibration characteristics (amplitude frequency response, phase frequency response, transient response, etc.) of the respective resonant systems may be the same or different. For example, each resonant system may be driven by the same driving force or by different driving forces. In some embodiments, the vibration speaker 31 or the air-conducted speaker 32 may be a single resonant system or a complex resonant system composed of multiple resonant systems. In one embodiment, the output module 3 may include a plurality of vibration speakers 31 and/or a plurality of air-conducted speakers 32.

Figure 11:
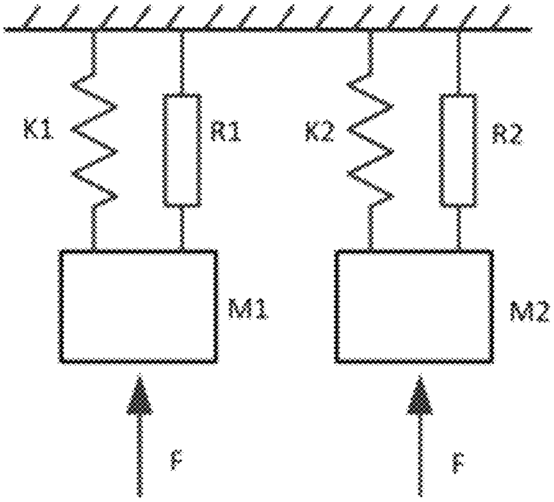
FIG. 11 shows a schematic diagram of the same driving force driving two resonant systems.

FIG. 11 shows a schematic diagram of the same driving force driving two resonant systems. In the present application, this figure corresponds to the case where the control signal of the signal processing module 2 can generate a driving force to drive the vibration speaker 31 and the air-conducted speaker 32 at the same time, so as to respectively generate a bone-conducted sound wave and an air-conducted sound wave.

For bone-conducted, the frequency and bandwidth may be changed by adjusting the above parameters. For example, by increasing the mass of the resonant system, reducing the system elastic modulus (such as employing a reed with a lower modulus of elasticity, using a material with a lower Young's modulus for the vibration transmission structure, reducing the thickness of the vibration transmission structure, etc.), the resonant frequency may be adjusted to the medium-low frequency band, such that the vibration of medium-low frequency band may be output. In contrast, by reducing the mass of the resonant system and increasing the coefficient of elasticity of the system (such as employing a reed with a higher modulus of elasticity, using a material with a higher Young's modulus in the vibration transmitting structure, increasing the thickness of the vibration transmitting structure, for example, adding the structures such as rib plate/rib piece to the vibration transmission structure), the resonant frequency may be adjusted to the medium high frequency band, such that the vibration of medium-high frequency bands may be output. For example, the system quality factor Q can be adjusted by adjusting the system damping, i.e., adjusting the bandwidth of the output vibration. Further, a composite vibration module having a plurality of resonance systems may be provided, where each resonant system may individually adjust its resonant frequency and quality factor Q. In this case, the center frequency and bandwidth of the output vibration of the composite vibration module may be adjusted by connecting the resonance systems in series or in parallel.

For the air-conducted sound waves, the center frequency may also be adjusted by adjusting the mass and elastic modulus of the resonant system, and the system damping may be adjusted in order to adjust the bandwidth of the output air-conducted sound waves. In some embodiments, one or more sound structures (for example, an acoustic cavity, a sound tube, a sound hole, a tuning hole, a tuning mesh, a tuning cotton, a passive membrane, and/or combinations thereof) may be provided to adjust the frequency component of the output air-conducted sound wave. For example, the modulus of elasticity of the system may be adjusted by adjusting the volume of the acoustic cavity (for example, if the volume of the acoustic cavity becomes larger, the elasticity coefficient of the system becomes smaller; if the volume of the acoustic cavity becomes smaller, the elasticity coefficient of the system becomes larger). In some embodiments, a sound tube or sound hole structure may be provided to adjust the mass and damping of the system (for example, the longer the length of the sound tube or sound hole and the smaller the cross-sectional area thereof, the greater the system mass and the smaller the system damping, and vice versa). In some embodiments, an acoustically resistive material (a tuning hole, mesh, cotton, etc.) may be placed on the path of the air-conducted sound wave to adjust the damping of the system. In some embodiments, a passive membrane structure may be provided to enhance the output of the low frequency band of the air-conducted sound waves. In some embodiments, a sound tube/inverting phase aperture structure may be provided to adjust the phase of the air-conducted sound wave output while adjusting the amplitude and frequency band of the air-conducted sound wave output. In some embodiments, an array of multiple air-conducted speakers may be provided. In some embodiments, the output amplitude, frequency band, and phase of each air-conducted speaker may be adjusted to achieve a sound field with a particular spatial distribution of the output of the entire array.

A user may also adjust the output characteristics of the bone-conducted and/or air-conducted sound waves by adjusting the amplitude, frequency, and phase of the control signal. A user can also adjust the output characteristics of the bone-conducted and/or air-conducted sound waves by simultaneously adjusting the control signal and the parameters of the resonance system.

Figure 12:
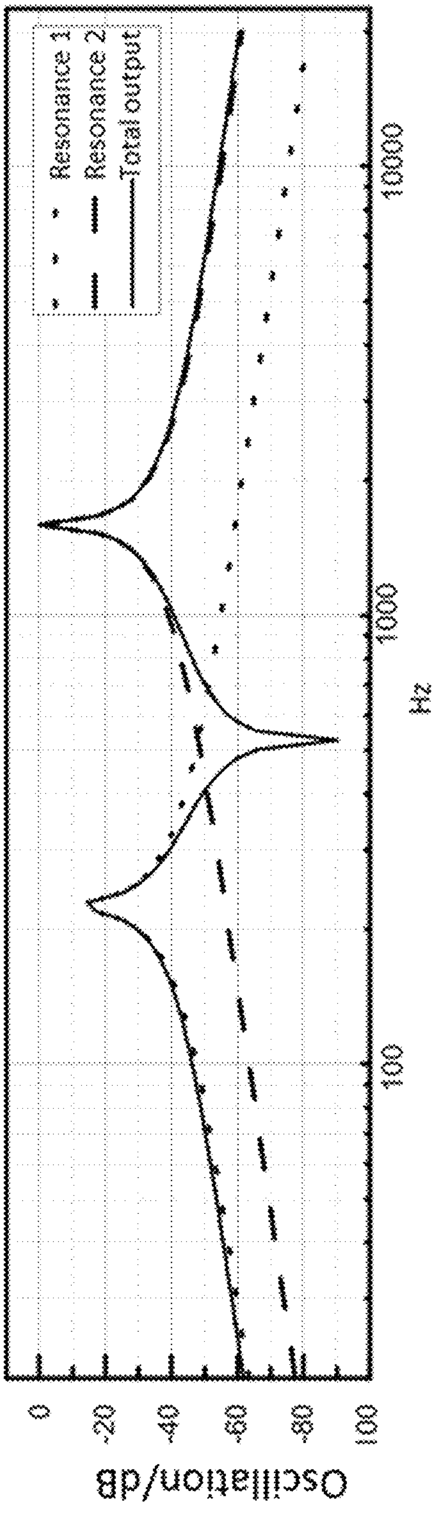
FIG. 12 shows the amplitude-frequency characteristics of two different resonant systems driven by the same driving force.
Figure 13:
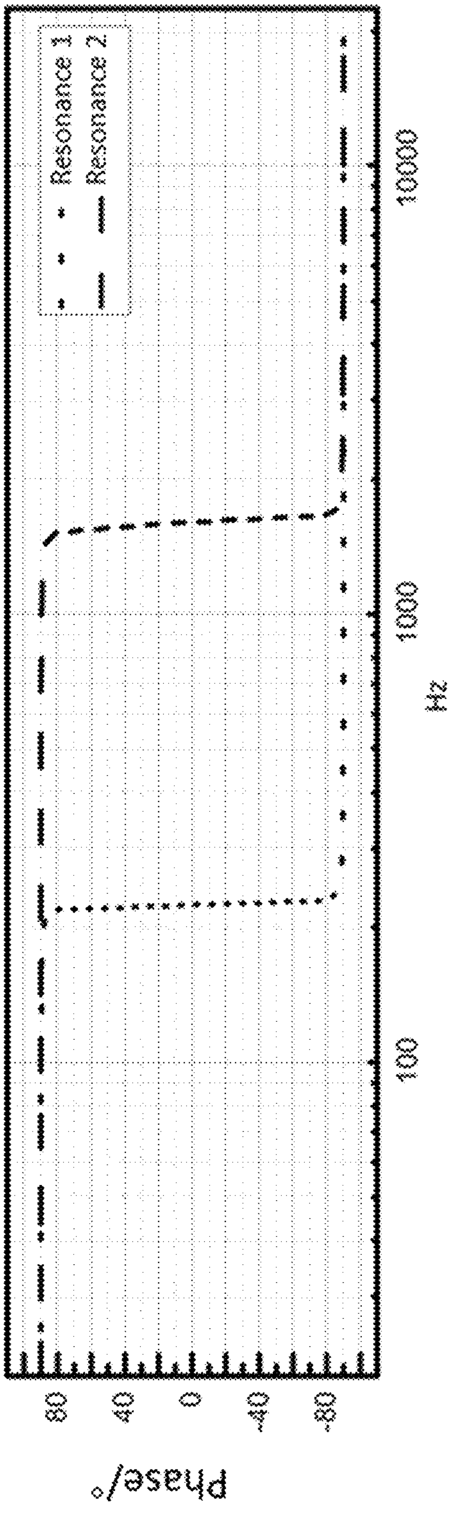
FIG. 13 shows the phase-frequency characteristics of two different resonant systems driven by the same driving force.

FIG. 12 shows the amplitude-frequency characteristics of two different resonant systems driven by the same driving force. FIG. 13 shows the phase-frequency characteristics of two different resonant systems driven by the same driving force. As shown in the figures, the first resonant system and the second resonant system each have different resonant frequencies. Correspondingly, the phase responses of the two resonant systems are also different. In particular, in the frequency band between the two resonant frequencies, the phase difference between the two resonant systems is 180 degrees, that is, they are inverted in phase. Accordingly, when the two resonance systems respectively output as the vibration speaker 31 or the air-conducted speaker 32, the vibration of the two resonance systems will cancel each other in that frequency band. As shown by the amplitude-frequency response curve of the total output in the figures, there is a significant loss in the frequency band between the two resonant frequencies.

Figure 14:
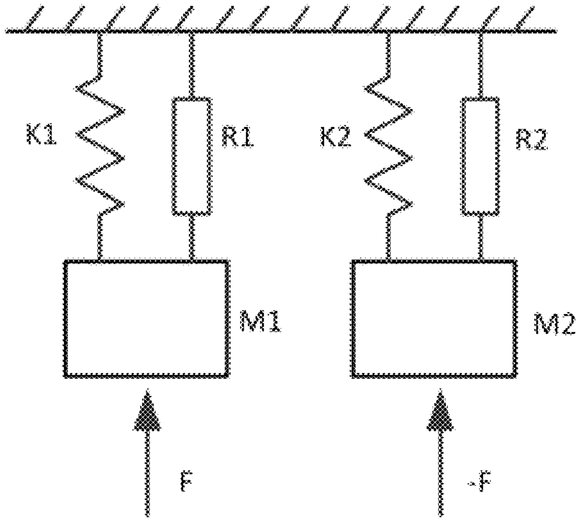
FIG. 14 shows a schematic diagram of a pair of opposing driving forces driving two resonant systems.

FIG. 14 shows a schematic diagram of a pair of opposing driving forces driving two resonant systems. In the present application, this figure corresponds to the case where the control signal of the signal processing module 2 can generate a pair of opposite driving forces, respectively driving the vibration speaker 31 and the air-conducted speaker 32 to generate a bone-conducted sound wave and an air-conducted sound wave, respectively. For example, in the moving coil configuration, a pair of force and reaction force, that is, the force on coil and the force on the magnetic circuit may be used as the driving forces.

Figure 15:
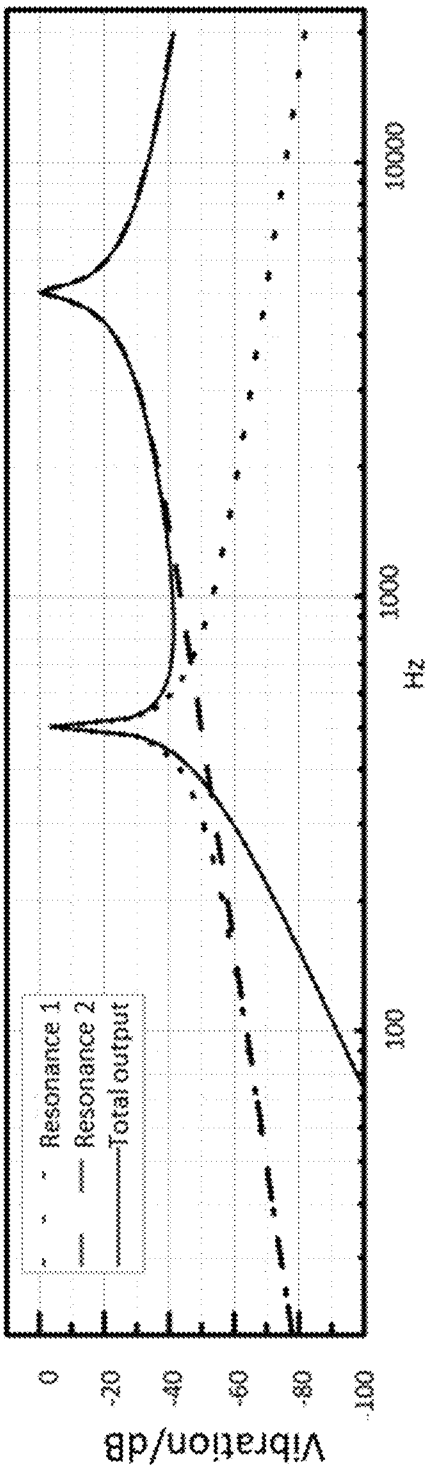
FIG. 15 shows the amplitude-frequency characteristics of two different resonant systems driven by the same driving force.
Figure 16:
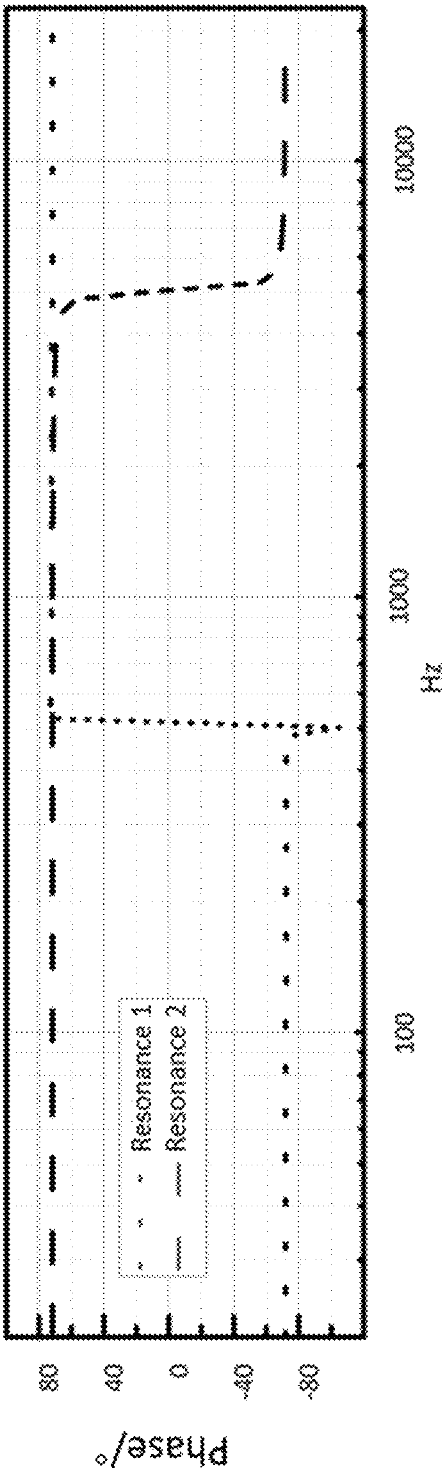
FIG. 16 shows the phase-frequency characteristics of two different resonant systems driven by the same driving force.

FIG. 15 shows the amplitude-frequency characteristics of two different resonant systems driven by the same driving force. FIG. 16 shows the phase-frequency characteristics of two different resonant systems driven by the same driving force. As shown in the figures, the first resonant system and the second resonant system have different resonant frequencies and phase frequency responses. In particular, in the frequency band between the two resonant frequencies, the phases of the two resonant systems are the same, but in other frequency bands, the phase difference between the two is 180 degrees, that is, they are in inverse phase. Therefore, when the two resonance systems are respectively the vibration speaker 31 or the air-conducted speaker 32, the vibrations of the two resonance systems may be increased or reduced in different frequency bands. As shown by the amplitude-frequency response curve of the total output in the figures, the two vibrations are increased through superimposition in the frequency band between the two resonance frequencies, and are reduced through superimposition in other frequency bands. Especially in the low frequency band, the cancellation is more significant.

Figure 17:
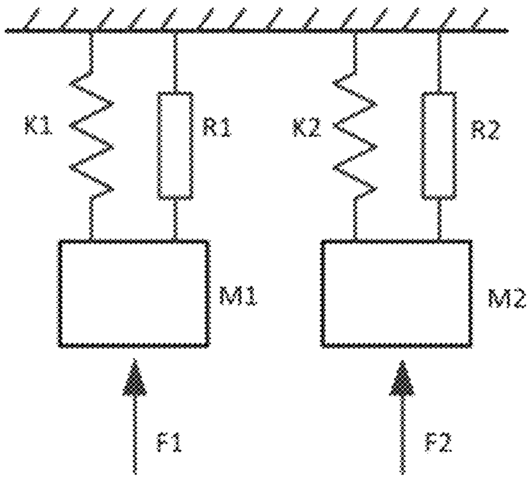
FIG. 17 shows a schematic diagram of different driving forces driving two resonant systems.

FIG. 17 shows a schematic diagram of different driving forces driving two resonant systems. In the present application, this figure corresponds to a case where the signal processing module 2 may include a bone-conducted signal processing circuit 21 and an air-conducted signal processing circuit 22, and the bone-conducted control signal of the bone-conducted signal processing circuit 21 generates a driving force to drive the vibration. The speaker 31 generates a bone-conducted sound wave, and the air-conducted control signal of the air-conducted signal processing circuit 22 generates another driving force to drive the air-conducted speaker 32 to generate an air-conducted sound wave. For example, in the moving coil configuration, the vibration speaker 31 and the air-conducted speaker 32 may be driven separately using different coils.

In some embodiments, a user can achieve various output effects by adjusting the amplitude at the same frequency of each control signal, the amplitude and phase at different frequencies. For example, the driving force may be adjusted by adjusting the amplitude of the corresponding bone-conducted control signal or the air-conducted control signal. For example, the driving force may have a specific amplitude-frequency characteristic through adjusting the amplitude of the corresponding bone-conducted control signal or the air-conducted control signal in different frequency bands, such that the output bone-conducted sound wave and air-conducted sound wave will have specific amplitude-frequency characteristics. For example, the driving force may have a specific phase-frequency characteristic by adjusting the phase of the corresponding bone-conducted control signal or air-conducted control signal in different frequency bands so that the output bone-conducted sound and the air-conducted sound wave have specific phase frequency characteristics. Through the above adjustment methods, the total output of the system can have different amplitude-frequency characteristics and phase-frequency characteristics.

In some embodiments, the driving force converted corresponding the signal may be adjusted by adjusting the electromechanical conversion coefficient of the respective output module. For example, in the moving coil configuration, the magnetic field strength, the coil impedance, the coil wire length, and the like can be adjusted in order to adjust the electromechanical conversion coefficient; while in the moving magnet structure, the electromechanical conversion coefficient can be adjusted by adjusting the magnetic field strength, the coil impedance, the number of turns of the coil, the shape of the coil, the elasticity of the armature, and the like.

In some embodiments, the amplitude and phase characteristics of the output can be adjusted by adjusting the mass, elasticity, and damping of the mechanical vibration module in the output module. For example, the amplitude and phase characteristics of the output can be adjusted by adjusting certain acoustic structures in the sound output module (such as, acoustic cavity, sound tube, tuning hole, tuning mesh, etc.).

Figure 18:
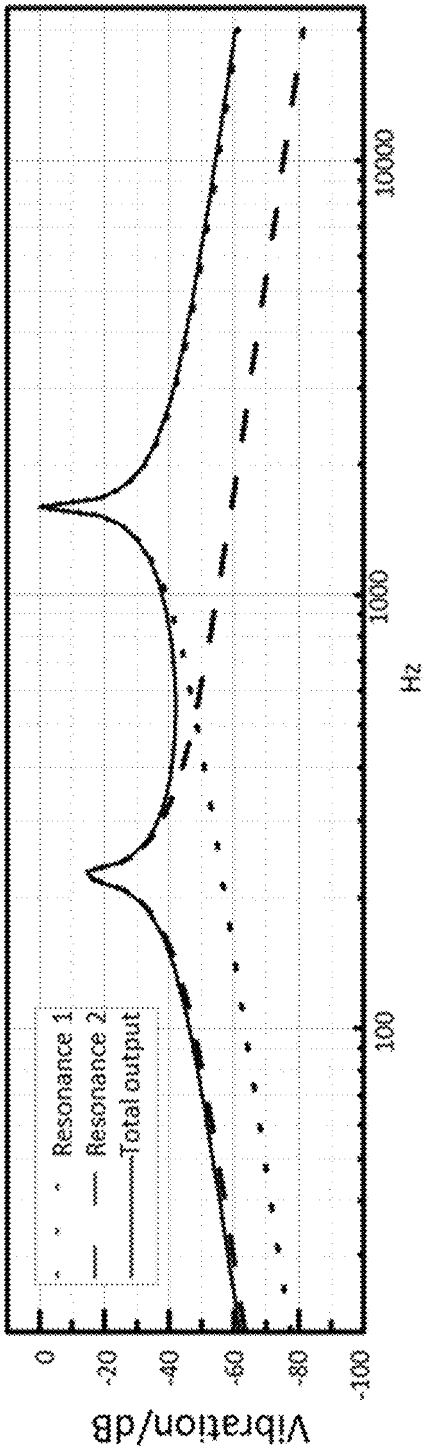
FIG. 18 shows the amplitude-frequency characteristics of two different resonant systems driven by the same driving force.

FIG. 18 shows the amplitude-frequency characteristics of two different resonant systems driven by the same driving force. In this case, the output phase enhancement effect can be achieved in a specific frequency band by means of adjusting the phase of the output of different resonant systems.

Figure 19:
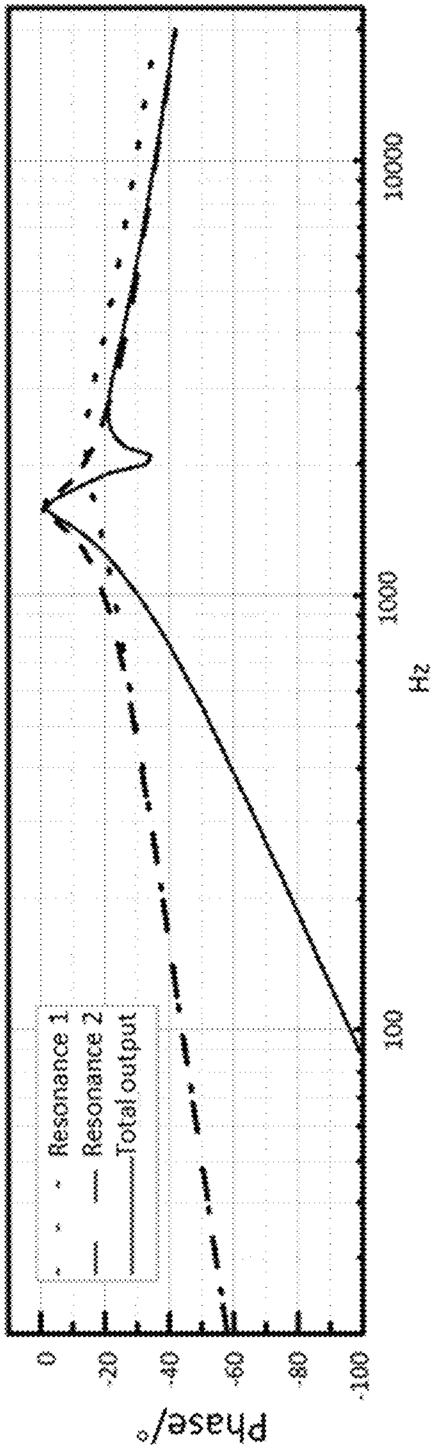
FIG. 19 shows the amplitude-frequency characteristics of two different resonant systems driven by the same driving force.

FIG. 19 shows the amplitude-frequency characteristics of two different resonant systems driven by the same driving force. In this case, the output phase cancellation effect can be achieved in a specific frequency band by means of adjusting the phase of the output of different resonant systems.

Figure 20:
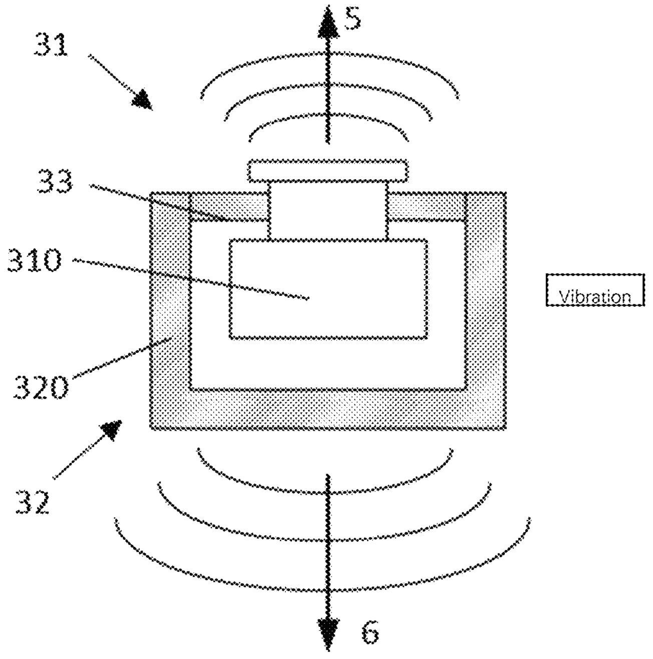
FIG. 20 shows a schematic diagram of a sound-output device provided in accordance with some embodiments of the present application.

FIG. 20 shows a schematic diagram of a sound-output device provided in accordance with some embodiments of the present application.

The vibration speaker 31 may include a vibration assembly 310. The vibration assembly 310 may be electrically coupled to the signal processing module to receive the control signal and generate the bone-conducted sound wave based on the control signal. For example, the vibration assembly 310 may be any component that can convert an electrical signal (for example, a control signal from the signal processing module 2) into a mechanical vibration signal (for example, a vibration motor, an electromagnetic vibration device, etc.). The manner of signal conversion includes but is not limited to: electromagnetic (moving coil type, moving magnet type, magneto-strictive type, etc.), piezoelectric type, electrostatic type and the like. The internal structure of the vibration assembly 310 may be a single resonance system or a composite resonance system. The vibration assembly 310 may perform a first mechanical vibration according to a control signal, wherein the first mechanical vibration may generate a bone-conducted sound wave 5. The vibration assembly 310 may include a contact portion for fitting a user's head skin when the user wears the sound-output device 1 on the head, thereby conducting the bone-conducted sound wave 5 to the cochlea of the user via the user's skull.

The air-conducted speaker 32 may include a housing 320. The housing 320 may be coupled to the vibration assembly 310 and generate an air-conducted sound wave 6 based on the bone-conducted sound waves 5. The housing 320 may be connected to the vibration assembly 310 via a connector 33. Moreover, the housing 320 may serve as a secondary resonance system for the first mechanical vibration. On the one hand, the housing 320 may be used as a mechanical system to generate a second mechanical vibration under the actuation of the first mechanical vibration; on the other hand, after the second mechanical vibration is transmitted into the air to form a sound (i.e., the air-conducted sound wave 6), the internal space of the housing 320 may play a role to amplify the sound as a resonant cavity. In some embodiments, the response of the housing 320 to the first mechanical vibration may be adjusted by adjusting the connector 33 between the housing 320 and the vibration assembly 310. That is, the acoustic effect of the housing 320 can be adjusted by adjusting the connector 33. For example, the connector 33 may be rigid, or the connector 33 may be flexible. For example, the connector 33 may be an elastic member such as a spring or an elastic piece. Since systems with different elastic moduli may have different amplitude responses to the same frequency input, by means of changing the spring constant of the connector 33 and/or the elastic modulus and mass of the housing 320, the amplitude response of the second mechanical vibration to different frequency actuation can be adjusted. In some embodiments, the sound-output device may be a headphone. For convenience of explanation, the headphone shown in FIG. 20 has a quadrangular structure. Of course, the headphone may also have another shape, such as a cylindrical shape, a common earplug shape, and any other shape suitable for the internal structure of the ear canal, and the like.

In summary, the sound-output device shown in FIG. 2 may directly output the bone-conducted sound wave when the vibration assembly 310 is in operation, for example, by outputting the bone-conducted sound to the human body by fitting the human skin. At the same time, the first mechanical vibration generated by the vibration assembly 310 may be transmitted to the housing 320 through the connector, so that the housing 320 may also have certain vibration, that is, the second mechanical vibration. The second vibration may function as a sound source of the air-conducted sound wave to transmit the sound to the outside, thereby realizing one device simultaneously outputting the bone-conducted sound wave and the air-conducted sound wave. Further, the bone-conducted sound wave and the air-conducted sound wave output by the sound-output device are from the same driving source, thus the bone-conducted sound wave (or the first mechanical vibration) and the air-conducted sound wave (or the second mechanical vibration) are correlated.

Figure 21:
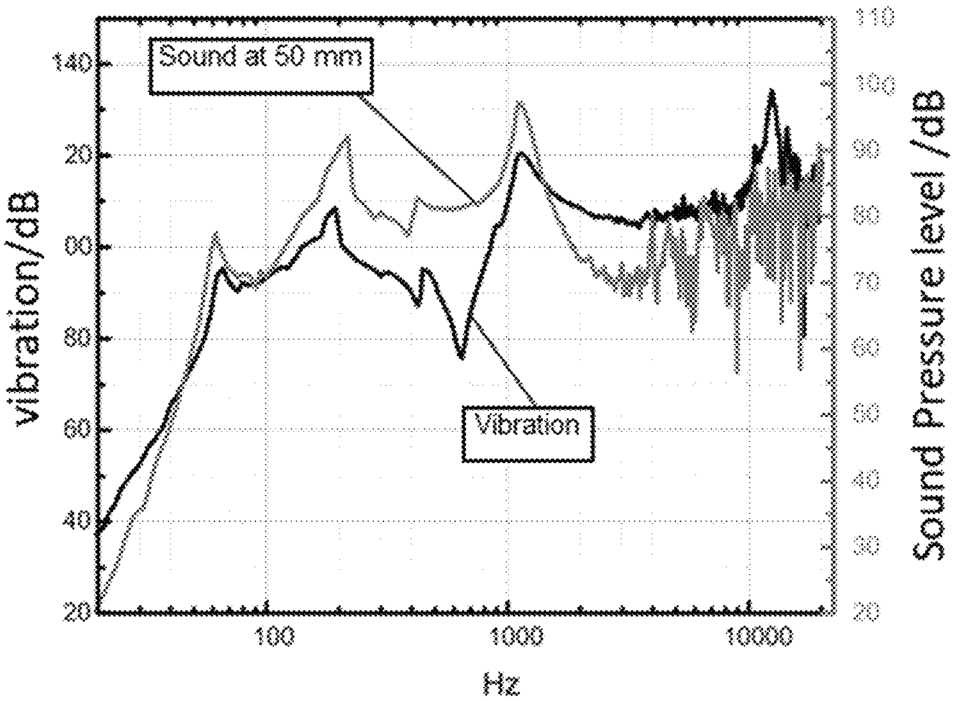
FIG. 21 shows the amplitude-frequency characteristics of bone-conducted sound waves and air-conducted sound waves provided in accordance with some embodiments of the present application.

FIG. 21 shows the amplitude-frequency characteristics of bone-conducted sound waves and air-conducted sound waves. As can be seen in this figure, the spectrum of the bone-conducted sound wave output is related to that of the air-conducted sound wave, and the positions of the respective resonance peaks correspond to each other. However, since the bone-conducted sound wave is generated by the vibration speaker 31, while the air-conducted sound wave is generated by the secondary resonance system in response to the first mechanical vibration, the amplitude responses of the actuation signal of the same frequency will be different. It can be seen from the amplitude-frequency characteristics of the bone-conducted sound wave and the air-conducted sound wave shown in FIG. 21 that the amplitude output of the bone-conducted sound wave output by the sound-output device is larger than that of the air-conducted sound wave within a frequency ranges of about 0 Hz to 23 Hz and about 1300 Hz or higher. In the frequency range of 23 Hz to 1300 Hz, the amplitude of the air-conducted sound wave output by the sound-output device is larger than that of the bone-conducted sound wave.

Human voice and instrument sound are basically concentrated between 20 Hz and 5 kHz. Therefore, if this range is set as a target frequency range, this target frequency range may be divided into three frequency bands: low frequency, medium frequency and high frequency. For example, as mentioned above, the low frequency may refer to a frequency band of substantially 20 Hz to 150 Hz, the medium frequency may refer to a frequency band of substantially 150 Hz to 5 kHz, and the high frequency band may refer to a frequency band of substantially 5 kHz to 20 kHz. In addition, the medium-low frequency may refer to the frequency band of approximately 150 Hz to 500 Hz, and the medium-high frequency may refer to the frequency band of 500 Hz to 5 kHz. A person of ordinary skill in the art will appreciate that the distinction of the above-described frequency bands is only given as an example for a general range. The definition of the above frequency bands may be changed in different industries, different application scenarios and different classification standards. For example, in other application scenarios, the low frequency refers to a frequency band of substantially 20 Hz to 80 Hz, the medium-low frequency may refer to a frequency band substantially between 80 Hz and 160 Hz, the medium frequency may refer to a frequency band of substantially 160 Hz to 1280 Hz, the medium-high frequency may refer to a frequency band of substantially 1280 Hz to 2560 Hz, and the high frequency band may refer to a frequency band of substantially 2560 Hz to 20 kHz.

For the same control signal from the signal processing module 2, the air-conducted sound wave has a larger amplitude output in the low frequency range, while the bone-conducted sound wave has a larger amplitude output in the high frequency range. In the medium frequency range, as separated by 1.3 HZ, the amplitude of the air-conducted sound wave output by the sound-output device may be greater than that of the bone-conducted sound wave, or may be smaller than that of the bone-conducted sound wave. Of course, the above description of the sound wave output is limited to the sound-output device shown in FIG. 20. Changing the design of the sound-output device may change the distribution of its output of bone-conducted sound wave and air-conducted sound wave.

Therefore, by adjusting the shape, position, and stiffness of different elements of the sound-output device, the sound-output device may adjust the output amplitude of the bone-conducted sound wave and the air-conducted sound wave in different frequency bands within the target frequency range, thereby causing different output sound effects. For example, for a bone-conducted headphone, the air-conducted sound waves may be used as a supplement to the bone-conducted sound waves so as to enhance the overall acoustic experience of the user.

In the following description, the present application will introduce different designs of the sound-output device.

Figure 22:
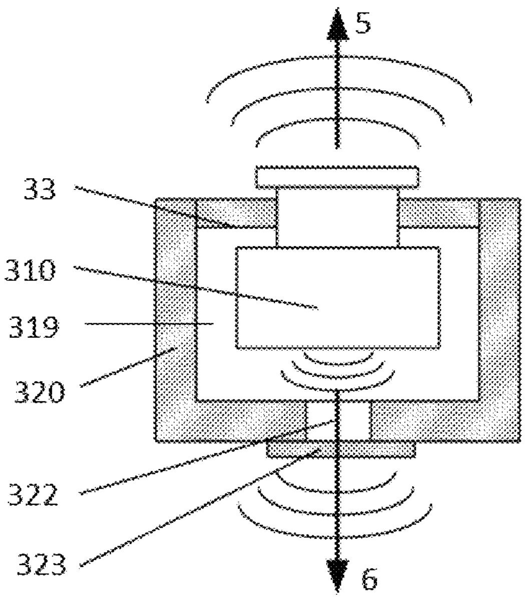
FIG. 22 shows a schematic diagram of a sound-output device provided in accordance with some embodiments of the present application.

FIG. 22 shows a schematic diagram of a sound-output device provided in accordance with some embodiments of the present application. The elements in FIG. 22 have the same or similar structures as the elements having the same reference numerals as shown in FIG. 20, and thus will not be repeated herein.

In this embodiment, the housing 320 further includes a sound hole 322. The air-conducted sound wave 6 is output from the interior of the housing 320 to the outside of the housing 320 through the sound hole 322. The air-conducted speaker 32 also includes a tuning mesh 323 that covers the sound hole 322. The tuning mesh 323 may be used to adjust the frequency of the air-conducted sound waves 6. In some embodiments, the housing 320 may define a cavity 319 to accommodate a portion of the vibration assembly 310. In some embodiments, the sound hole 322 may be a tuning hole that exports the air-conducted sound wave generated by the first mechanical vibration of the vibration assembly 310 inside the housing 320 due to air vibration to outside of the housing 320, which then interacts with the air-conducted sound wave generated from the vibration of the housing 320 by itself (that is, the second mechanical vibration) to form a combined air-conducted sound wave output. In some embodiments, the housing 320 may include a plurality of sound holes 322. A user may adjust the air-conducted sound wave output by adjusting the number, position, size, and/or shape of the sound holes 322.

Figure 23:
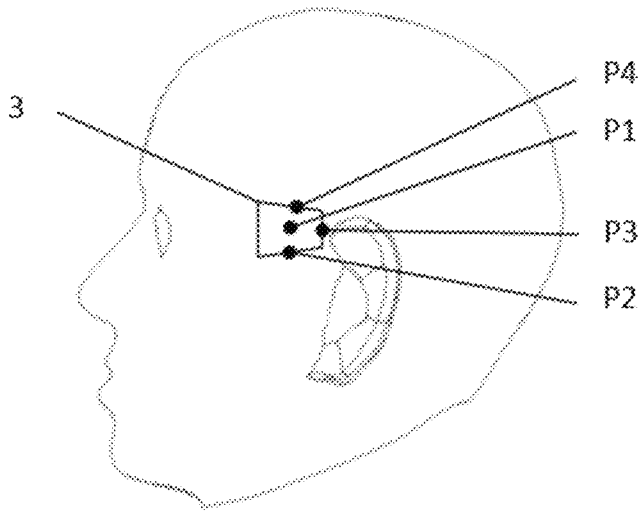
FIG. 23 is a schematic view showing different positions of the sound hole.

FIG. 23 shows a schematic view of different positions of the sound hole. In some embodiments, the sound hole 322 may be oriented to face away from a temple of a user when the sound-output device is worn by the user on the temple. In some embodiments, the sound hole 322 may be oriented to face an external auditory canal of a user when the sound-output device is worn by the user on a temple thereof. In some embodiments, the sound hole 322 may be oriented to face a rear side of an ear of a user when the sound-output device is worn by the user on a temple thereof. In some embodiments, the sound hole 322 may be oriented to face a top portion of the head of a user when the sound-output device is worn by the user on a temple thereof.

Figure 24:
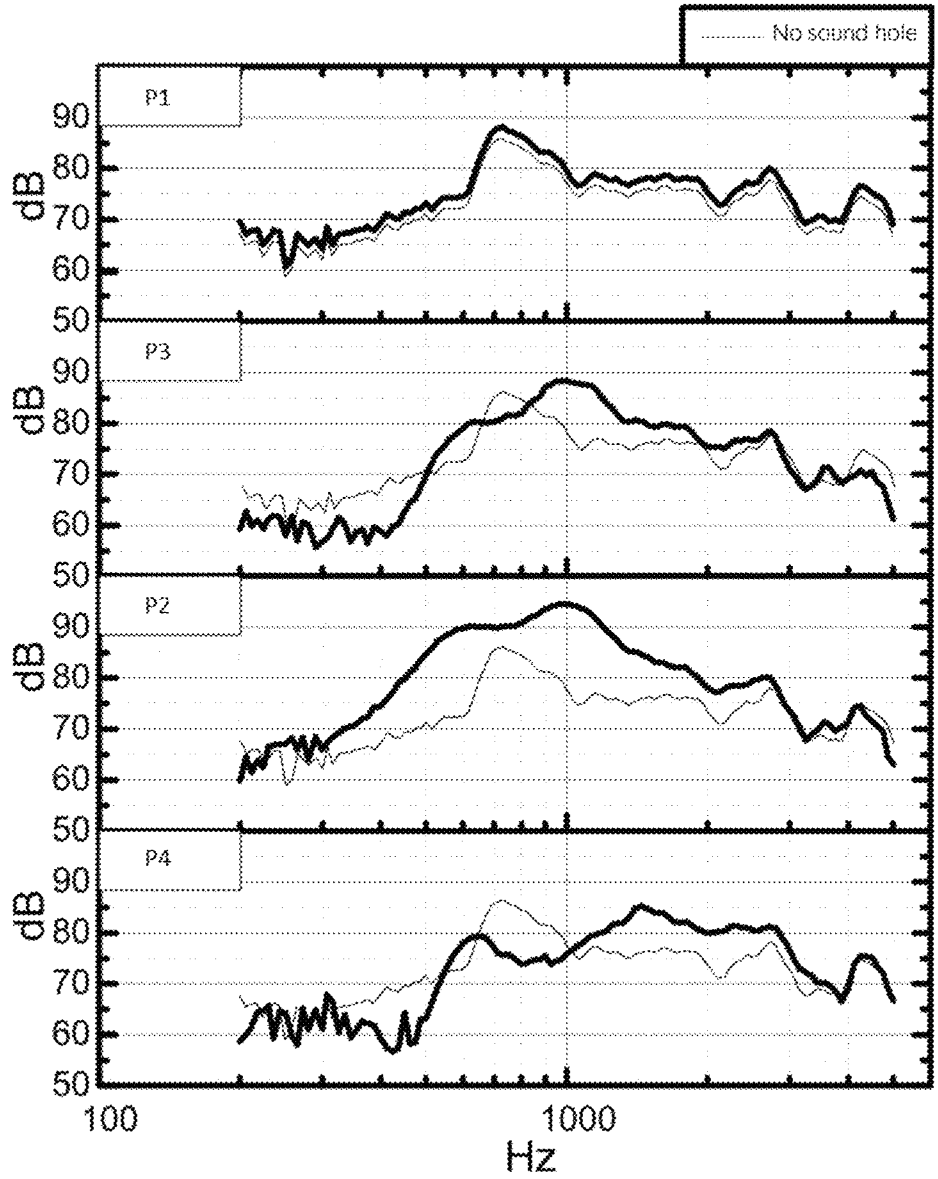
FIG. 24 shows the amplitude-frequency characteristics of air-conducted sound waves at different sound hole positions.

FIG. 24 shows the amplitude-frequency characteristics of air-conducted sound waves at different sound hole positions. As shown in the figure, it is assumed that the sound-output device is placed in a front upper position of the ear so that the vibration speaker is fitted to the head to output the vibration. As the sound hole may be set at different positions of the housing, and the air-conducted sound wave transmitted to the human ear may be different. In contrast to the case without the sound hole, the sound hole disposed on the back side of the housing (position P1) may cause an increase in the high frequency portion and a decrease in the medium frequency portion of the air-conducted sound wave transmitted to the human ear. The sound hole disposed on a side surface of the housing and facing toward the ear (position P2) may cause a significant increase in the medium-high frequency portion of the air-conducted sound wave transmitted to the human ear, which may improve the overall sound volume and improve the quality of voice communication. The sound hole disposed on a side surface of the housing and facing toward a rear side of the ear (position P3) may cause an increase in the medium-high frequency portion of the air-conducted sound wave transmitted to the human ear, yet such increase is not as large as that in the case where the sound hole is arranged to face toward the ear. The sound hole disposed on a side surface of the housing and pointing toward the top of the head (position P4) may cause a slight increase of the air-conducted sound wave transmitted to the human ear, yet the effect is not significant. Further, the position of the sound hole is not limited to the above single position, and may be a combination of a plurality of various positions, and the number of sound holes may be one or more than one.

Therefore, by adjusting the position of the sound hole on the housing 320, shape, the amplitude-frequency characteristic of the air-conducted sound wave of the sound-output device may be further adjusted, such that the design of the sound-output device may be adjusted to change the distribution of the output of bone-conducted sound wave and air-conducted sound wave. For example, for a bone-conducted headphone, the air-conducted sound waves may be used as a supplement to the bone-conducted sound waves so as to enhance the overall acoustic experience of the user.

Figure 25:
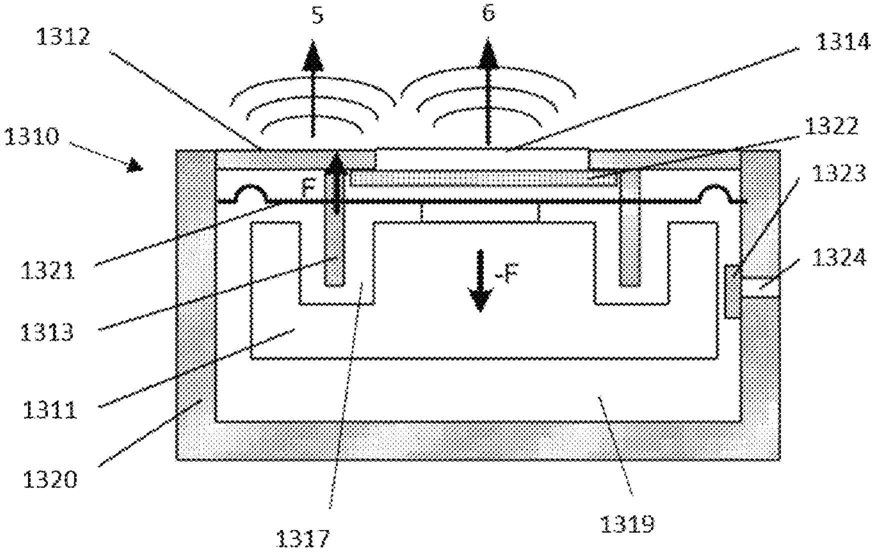
FIG. 25 shows a schematic diagram of a sound-output device provided in accordance with some embodiments of the present application.

FIG. 25 shows a schematic diagram of a sound-output device provided in accordance with some embodiments of the present application. The elements in FIG. 25 have the same or similar structures as the elements having the same reference numerals as shown in FIG. 20, and thus will not be repeated herein.

The vibration speaker 131 may include a vibration assembly 1310. The vibration assembly 1310 may be electrically connected to the signal processing module to receive the control signal and generate a bone-conducted sound wave 5 based on the control signal. The vibration assembly 1310 may perform a first mechanical vibration according to the control signal, wherein the first mechanical vibration generates the bone-conducted sound wave 5.

The vibration assembly 1310 may further include a magnetic circuit system 1311, a vibration plate 1312, and a coil 1313. The magnetic circuit system 1311 may be configured to generate a first magnetic field. In particular, the magnetic circuit system 1311 may include a magnetic gap 1317 and be configured to generate the first magnetic field in the magnetic gap 1317. The vibration plate 1312 may be connected to the housing 1320 of the air-conducted speaker 32. The coil 1313 may be mechanically connected to the vibration plate 1312 and electrically connected to the signal processing module. The coil 1313 may be placed in the magnetic gap 1317. The coil 1313 receives the control signal and generates a second magnetic field based on the control signal. Since the first magnetic field interacts with the second magnetic field, the coil 1313 is subjected to a force F, so as to actuate the vibration plate 1312 to vibrate, and generate the bone-conducted sound wave 5. The vibration plate 1312 may also include a sound hole 1314.

The air-conducted speaker 32 may include a housing 1320, a membrane 1321, a first tuning mesh 1322, and a second tuning mesh 1323. The housing 1320 may be connected to the vibration plate 1312 to define a cavity 1319 that houses the magnetic circuit system 1311 and the membrane 1321. The housing 1320 may include a tuning hole 1324. The membrane 1321 may be connected to the magnetic circuit system 1311 and the housing 1320. Due to the interaction between the first magnetic field and the second magnetic field, the magnetic circuit system 1311 is also subjected to a corresponding reaction force −F and thus actuates the membrane 1321 to vibrate, so as to generate the air-conducted sound wave 6. The air-conducted sound wave 6 may be output from inside the housing 1320 (i.e., the cavity 1319) to outside the housing 1320 through the sound hole 1314. The first tuning mesh 1322 may cover the sound hole 1314 to adjust the frequency of the air-conducted sound wave 6. The second tuning mesh 1323 may cover the tuning hole 1324 to adjust the pressure inside the housing 1320 so as to adjust the frequency of the air-conducted sound wave 6. In some embodiments, there are more than one sound holes 1314. In some embodiments, there are more than one tuning hole 1324.

The output characteristics of the bone-conducted sound wave 5 may be adjusted by means of adjusting the stiffness of the vibration plate 1312 and/or housing 1320 (e.g., structural dimension, material elastic modulus, rib plate, rib piece, etc.). The output characteristics of the air-conducted sound wave 6 may be adjusted by means of adjusting the shape, elastic modulus, and damping of the membrane 1321. The output characteristics of the air-conducted sound wave 6 may be adjusted by means of adjusting the number, position, size, and/or shape of the sound hole 1314 and/or the tuning hole 1324.

Figure 26:
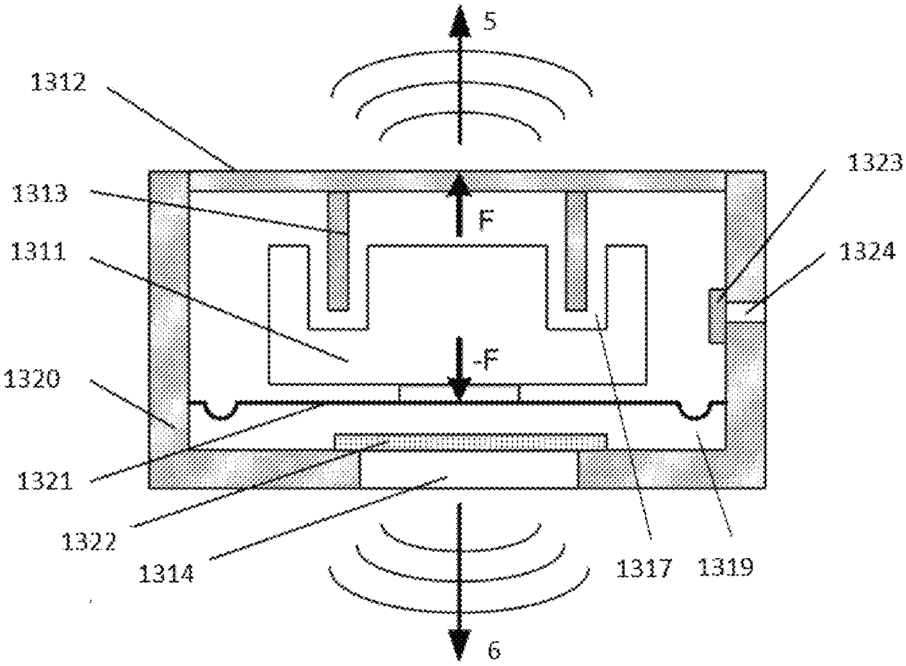
FIG. 26 shows a schematic diagram of a sound-output device provided in accordance with some embodiments of the present application.

FIG. 26 shows a schematic diagram of a sound-output device provided in accordance with some embodiments of the present application. The embodiment shown in FIG. 26 is similar to that shown in FIG. 25, except that in the embodiment shown in FIG. 26, the sound hole 1314 is disposed on the housing 1320 instead of the vibration plate 1312.

Figure 27:
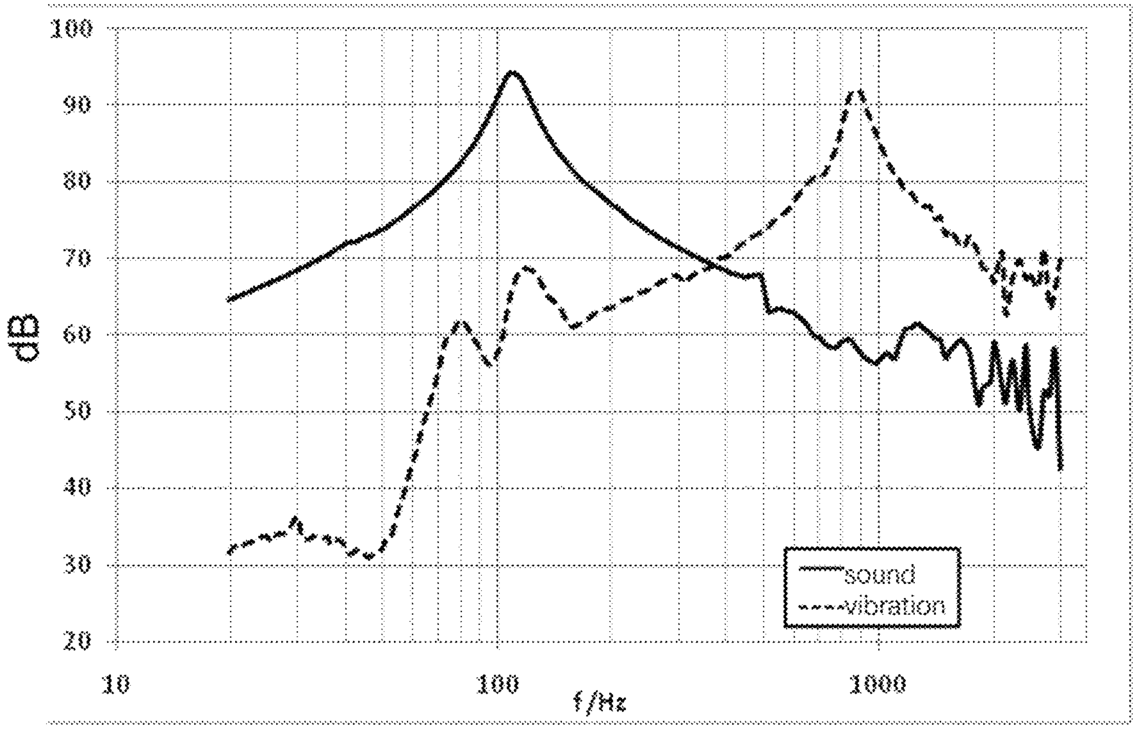
FIG. 27 shows the amplitude-frequency characteristics of bone-conducted sound waves and air-conducted sound waves.

FIG. 27 shows the amplitude-frequency characteristics of bone-conducted sound wave and air-conducted sound wave. As shown in the figure, in some embodiments, the resonant frequency of the output bone-conducted sound wave can be raised to high frequency by increasing the stiffness of the vibration plate and housing. In addition, the resonant frequency of the output air-conducted sound wave may be controlled at low frequency by adjusting the magnetic circuit mass, membrane elastic modulus, and adding a tuning hole. Bone-conducted sound waves allow people to hear the sounds through bone-conducted, while air-conducted sound waves allow people to hear the sound through traditional air-conducted. Bone-conducted sound waves and air-conducted sound waves in different frequency bands may complement each other and enhance the user's listening experience. It may allow a user to hear enough sounds of low frequency without feeling strong low frequency vibrations. In addition, bone-conducted sound waves may also enhance the user's perception of high frequency sounds.

Figure 28:
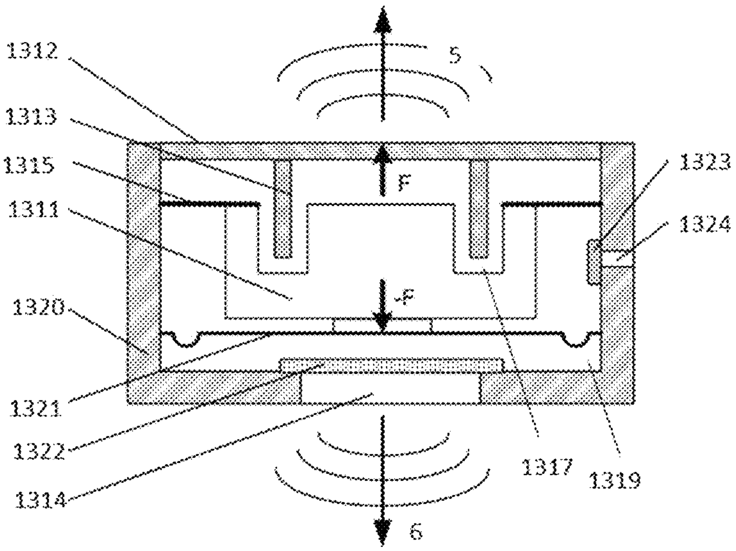
FIG. 28 shows a schematic diagram of a sound-output device provided in accordance with some embodiments of the present application.

FIG. 28 shows a schematic diagram of a sound-output device provided in accordance with some embodiments of the present application. The embodiment shown in FIG. 28 is similar to that shown in FIG. 26, except that in the embodiment shown in FIG. 28, the magnetic circuit system 1311 is connected to the housing 1320 via a first elastic member 1315. By connecting the magnetic circuit system 1311 and the housing 1320 with the first elastic member 1315, a part of the vibration generated by the magnetic circuit system 1311 is output to the housing 1320 to combine with the vibration of the vibration plate 1312 so as to form an output of the bone-conducted sound wave; the other portion of the vibration generated by the magnetic circuit system 1311 actuates the membrane 1321 to produce an output of the air-conducted sound wave. By adjusting the elastic modulus of the first elastic member 1315, at least two resonance peaks can be generated in the audible range of the human ear, thereby generating a broader frequency output of the bone-conducted sound wave.

Figure 29:
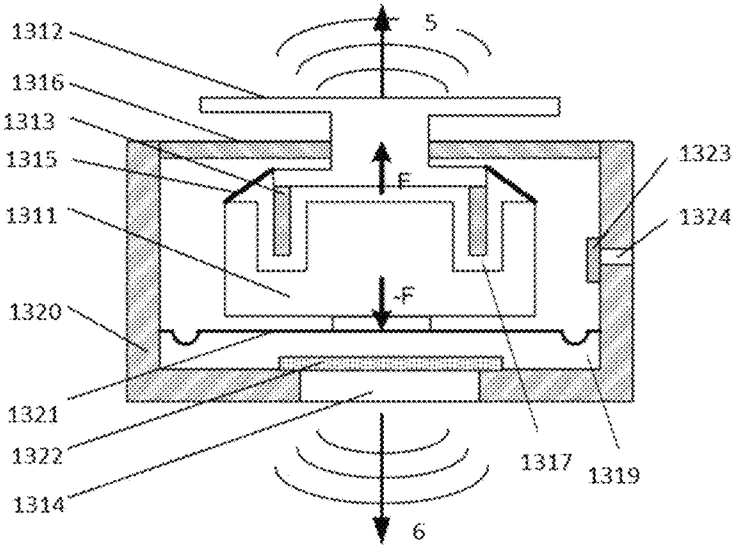
FIG. 29 shows a schematic diagram of a sound-output device provided in accordance with some embodiments of the present application.

FIG. 29 shows a schematic diagram of a sound-output device provided in accordance with some embodiments of the present application. The embodiment shown in FIG. 29 is similar to that shown in FIG. 26, except that in the embodiment shown in FIG. 29, the magnetic circuit system 1311 is connected to the vibration plate 1312 via the first elastic member 1315, and the vibration plate 1312 is connected to the housing 1320 through the second elastic member 1316. In the present embodiment, the magnetic circuit system 1311 is not connected to the housing 1320. In some embodiments, the vibration plate 1312 may have a "工" shaped cross-section, the upper portion of the vibration plate 1312 may be located outside of the cavity 1319, and the lower portion of the vibration plate 1312 may be located within the cavity 1319. In some embodiments, the magnetic circuit system 1311 may be connected to the middle of the vibration plate 1312 through an elastic member 1315. By adjusting the elastic modulus of the first elastic member 1315 and/or the second elastic member 1316, at least three resonance peaks may be generated in the audible range of the human ear, thereby generating an even more broad frequency output of the bone-conducted sound wave.

Figure 30:
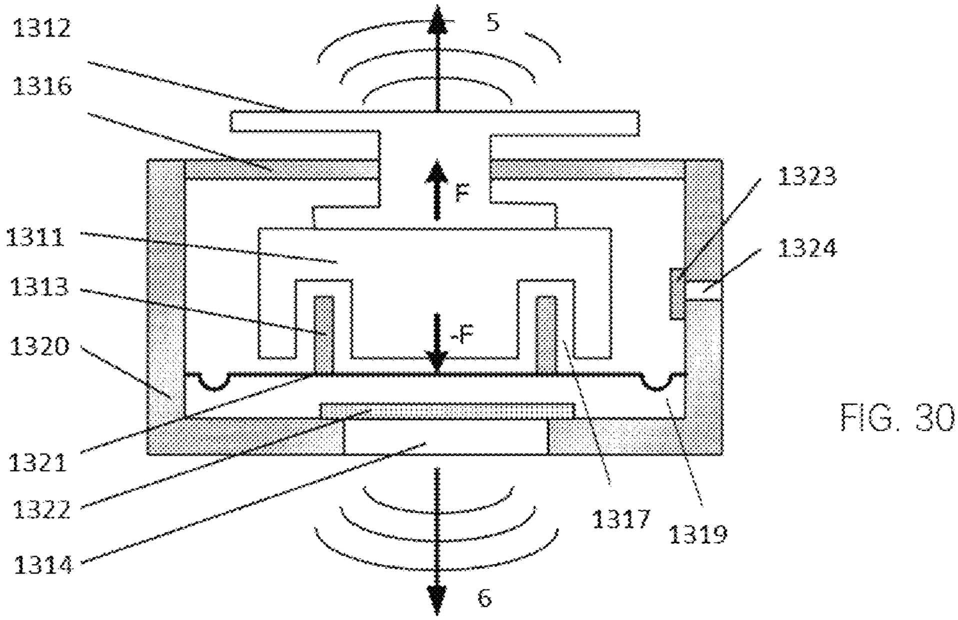
FIG. 30 shows a schematic diagram of a sound-output device provided in accordance with some embodiments of the present application.

FIG. 30 shows a schematic diagram of a sound-output device provided in accordance with some embodiments of the present application. The embodiment shown in FIG. 30 is similar to that shown in FIG. 26, except that in the embodiment shown in FIG. 30, the vibration assembly 1310 may further include a magnetic circuit system 1311 and a vibration plate 1312 rigidly connected to each other, the vibration plate 1312 is connected to the housing 1320 by the second elastic member 1316, and the air-conducted speaker 32 may include a coil 1313 and a membrane 1321 that are connected to each other. In the present embodiment, the coil 1313 is not connected to the vibration plate 1312. In the present embodiment, since the system composed of the coil 1313 and the membrane 1321 has a small mass, a broad frequency air-conducted sound wave output may be achieved. Further, since the mass of the magnetic circuit system 1311, the vibrating plate 1312 and the second elastic member 1316 is large, the low frequency bone-conducted sound wave output may be achieved by adjusting the elastic modulus of the second elastic member 1316.

Figure 31:
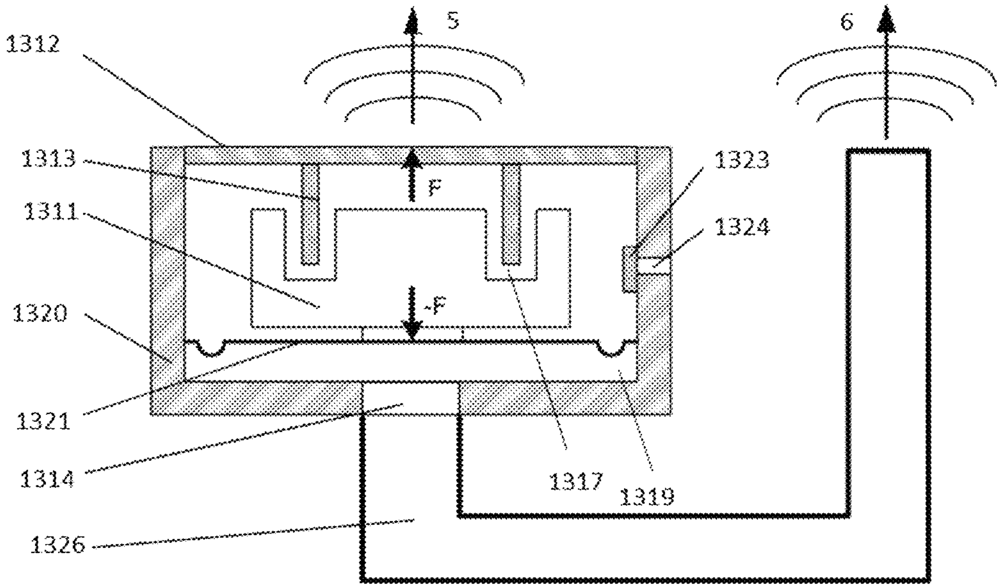
FIG. 31 shows a schematic diagram of a sound-output device provided in accordance with some embodiments of the present application.

FIG. 31 shows a schematic diagram of a sound-output device provided in accordance with some embodiments of the present application. The embodiment shown in FIG. 31 is similar to that shown in FIG. 26, except that in the embodiment shown in FIG. 31, the first tuning mesh 1322 is not provided, and the air-conducted speaker 32 may include a sound tube 1326. The sound tube 1326 may be connected to the housing 1320 and in communication with the sound hole 1314, and configured to adjust the phase of the air-conducted sound wave 6 and/or change the direction of the air-conducted sound wave 6, thereby adjusting the output quality of the air-conducted sound wave 6 and enhancing the output effect of the air-conducted sound wave 6. For example, the air-conducted sound wave 6 is guided to the ear through the sound tube 1326, which may the volume of the air-conducted sound wave heard by the ear.

Figure 32:
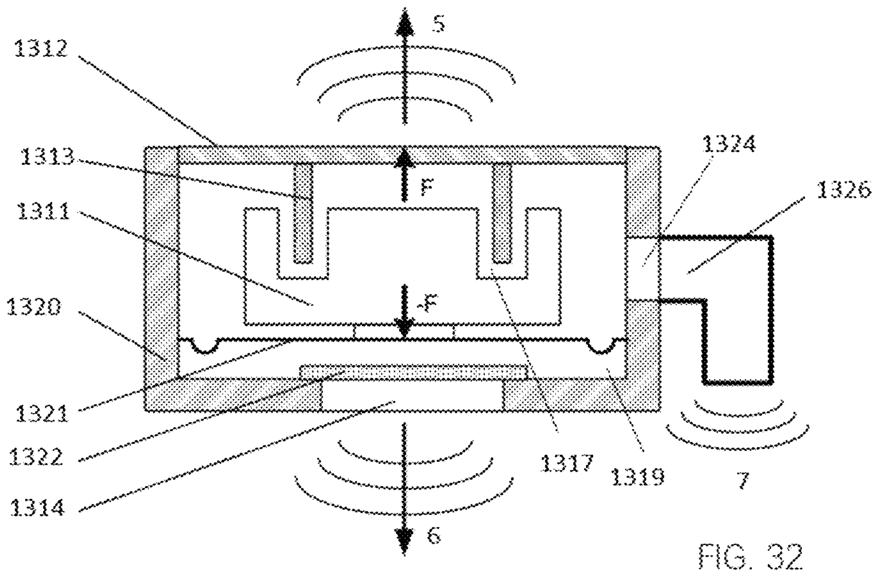
FIG. 32 shows a schematic diagram of a sound-output device provided in accordance with some embodiments of the present application.

FIG. 32 shows a schematic diagram of a sound-output device provided in accordance with some embodiments of the present application. The embodiment shown in FIG. 32 is similar to that shown in FIG. 26, except that in the embodiment shown in FIG. 32, the second tuning mesh 1323 is not provided, and the air-conducted speaker 32 may include a sound tube 1326. The sound tube 1326 may be connected to the housing 1320 and in communication with the tuning hole 1324. By providing the sound tube 1326 at a non-sound-hole (e.g., the tuning hole 1324), the phase of the air-conducted sound wave 6 may be adjusted; in addition, the air-conducted sound wave 7 led out by the sound tube 1326 may be superimposed on the air-conducted sound wave 6 output from the sound hole 1314, so as to regulate the final air-conducted sound wave.

Figure 33:
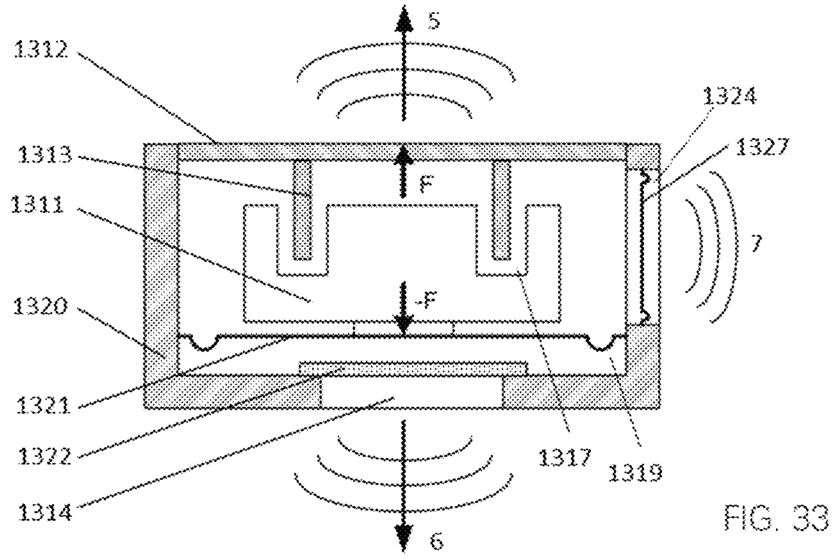
FIG. 33 shows a schematic diagram of a sound-output device provided in accordance with some embodiments of the present application.

FIG. 33 shows a schematic diagram of a sound-output device provided in accordance with some embodiments of the present application. The embodiment shown in FIG. 33 is similar to that shown in FIG. 26, except that in the embodiment shown in FIG. 33, the second tuning mesh 1323 is not provided, the air-conducted speaker 32 may include a passive membrane 1327, and the passive membrane 1327 may be mechanically connected to the tuning hole 1324. While the vibration plate 1312 vibrates to generate the bone-conducted sound wave, the air pressure inside the housing 1320 may change and/or vibrate accordingly. By providing the passive membrane 1327 over the non-sound-hole (e.g., tuning hole 1324), the vibration of the passive membrane 1327 may generate a secondary air-conducted sound wave 7 due to the change of air pressure between the inside and outside of the housing 1320 (i.e., the bone-conducted sound waves cause air pressure changes in the housing, thereby actuating the passive membrane to vibrate to generate a secondary air-conducted sound wave 7), and the secondary air-conducted sound wave 7 may be superimposed on the air-conducted sound wave 6 output from the sound hole 1314 so as to regulate the final air-conducted sound wave.

Figure 34:
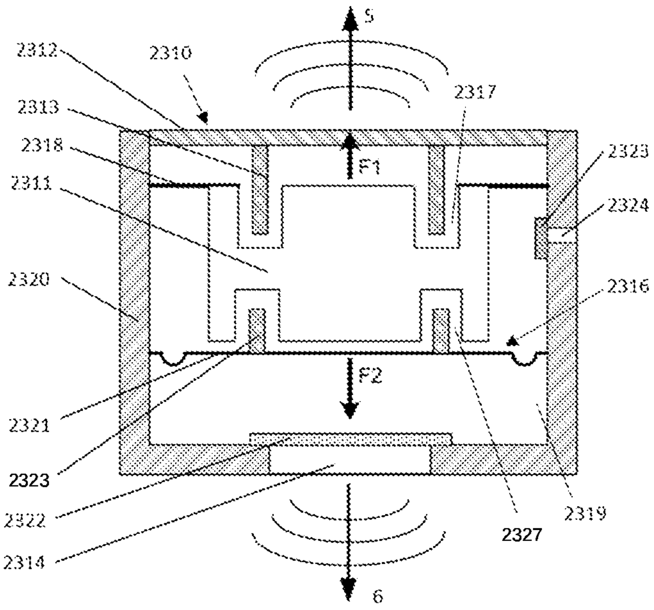
FIG. 34 shows a schematic diagram of a sound-output device provided in accordance with some embodiments of the present application.

FIG. 34 shows a schematic diagram of a sound-output device provided in accordance with some embodiments of the present application.

The vibration speaker 31 may include a first vibration assembly 2310 and an elastic member 2318. The first vibration assembly 2310 may be electrically connected to the bone-conducted signal processing circuit 21 to receive the bone-conducted control signal and generate the bone-conducted sound wave 5 based on the bone-conducted control signal. The first vibration assembly 2310 may include a magnetic circuit system 2311, a vibration plate 2312, and a first coil 2313. The magnetic circuit system 2311 may be connected to the housing 2320 of the air-conducted speaker 32 via the elastic member 2318. The magnetic circuit system 2311 may be configured to generate a first magnetic field. Specifically, the magnetic circuit system 2311 may include a first magnetic gap 2327, and a second magnetic gap 2317, and configured to generate the first magnetic field in the first magnetic gap 2317 and the second magnetic gap 2327. The vibration plate 2312 may be connected to the housing 2320. The first coil 2313 may be mechanically connected to the vibration plate 2312 and electrically connected to the bone-conducted signal processing circuit 21. The first coil 2313 can be disposed in the first magnetic gap 2317. The first coil 2313 receives the bone-conducted control signal and generates a second magnetic field based on the bone-conducted control signal, and the first coil 2313 is subjected to a force F1 due to the interaction between the first magnetic field and the second magnetic field, so as to actuate the vibration plate 2312 to vibrate and generate the bone-conducted sound wave 5. The vibration plate 2312 may include a sound hole 2314.

The air-conducted speaker 32 may include a housing 2320, a second vibration assembly 2316, a first tuning mesh 2322, and a second tuning mesh 2323. The housing 2320 may be connected to the vibration plate 2312 to define a cavity 2319 that houses the magnetic circuit system 2311 and the membrane 2321. The second vibration assembly 2316 may be electrically connected to the air-conducted signal processing circuit 22 to receive the air-conducted control signal and generate the air-conducted sound wave 6 based on the air-conducted control signal. The second vibration assembly 2316 may include a membrane 2321 and a second coil 2323. The membrane 2321 may be connected to the housing 2320 and the second coil 2323. The second coil 2323 may be electrically connected to the air-conducted signal processing circuit 22. The second coil 2323 may be disposed in the second magnetic gap 2327. The second coil 2323 may receive the air-conducted control signal and generate a third magnetic field based on the air-conducted control signal due to the interaction between the first magnetic field and the third magnetic field, the second coil 2323 is subjected to a force F2 to actuate the membrane 2321 to vibrate, so as to produce the air-conducted sound wave 6. The air-conducted sound wave 6 may be output from inside the housing 2320 (i.e., the cavity 2319) to outside the housing 2320 through the sound hole 2314. The first tuning mesh 2322 may cover the sound hole 2314 to adjust the frequency of the air-conducted sound wave 6. The second tuning mesh 2323 may cover the tuning hole 2324 to adjust the pressure inside the housing 2320 so as to adjust the frequency of the air-conducted sound wave 6. In some embodiments, there are more than one sound hole 2314. In some embodiments, there are more than one tuning hole 2324.

In summary, by means of adjusting the position of the sound hole on the sound-output device, adjusting the stiffness of the vibration plate and the housing, adjusting the magnetic circuit mass, adjusting the membrane elastic modulus, and proving the tuning hole, and the like, the frequency and amplitude ranges of the air-conducted sound wave and bone-conducted sound wave output by the sound-output device may be adjusted. The bone-conducted sound wave allows people to hear sound through bone-conducted, while the air-conducted sound wave allows people to hear sound through the traditional air-conducted. Thus, the bone-conducted sound waves and air-conducted sound waves in different frequency bands may complement each other and enhance the overall acoustic experience of the user.

Figure 35:
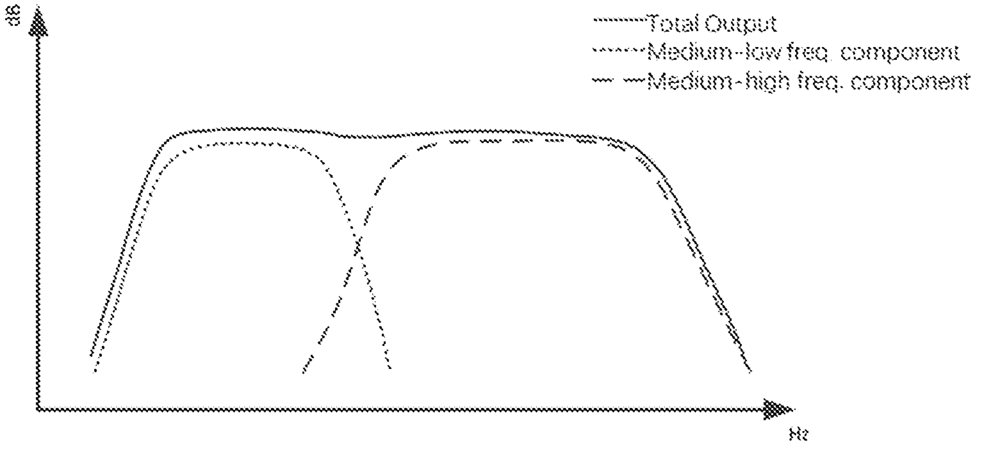
FIG. 35 shows the amplitude-frequency characteristics of a sound-output device according to some embodiments of the present application.

For example, FIG. 35 illustrates a frequency-frequency characteristic of a sound-output device provided in accordance with some embodiments of the present application. As shown in the figure, for example, the bone-conducted sound wave and the air-conducted sound wave contain different frequency components, which may lead to a technical effect of various frequency bands complementing one another.

In some embodiments, the air-conducted sound wave includes a medium-low frequency component and the bone-conducted sound wave includes a medium-high frequency component. A user may hear the medium-low frequency sounds through air-conducted, and hear the medium-high frequency sounds through the bone-conducted. By supplementing the low frequency with the air-conducted sound wave, the sound quality (especially at the low frequency) can be ensured while avoiding the strong vibration feeling caused by the low frequency bone-conducted sound wave.

In some embodiments, the sound-output device is configured to output sound waves within a target frequency range, where the bone-conducted sound waves include a high frequency portion of the target frequency range, while the air-conducted sound waves include a low frequency portion of the target frequency range.

In some embodiments, the bone-conducted sound waves may include a medium frequency portion of the target frequency range, and the air-conducted sound waves may include a medium frequency portion of the target frequency range.

In some embodiments, the air-conducted sound waves may include a medium-high frequency band component and the bone-conducted sound wave may include a medium-low frequency band component. As a user's ear is usually more sensitive to the medium-high frequency sound and the user's skin is usually more sensitive to low frequency mechanical vibrations, the above output mode can simultaneously provide a prompt to the user both audibly and tactilely, thereby achieving an auditory and tactile dual mode of prompt/alert.

In some embodiments, the vibration speaker may be further configured to generate a low frequency vibration wave that is perceivable by the user's skin.

In some embodiments, a user may make the air-conducted sound waves and bone-conducted sound waves respectively contain the required frequency band components by adjusting the parameters of the respective signal processing module (for example, the bone-conducted signal processing module and the air-conducted signal processing module) and/or the output module (for example, the vibration speaker, the air-conducted speaker).

Figure 36:
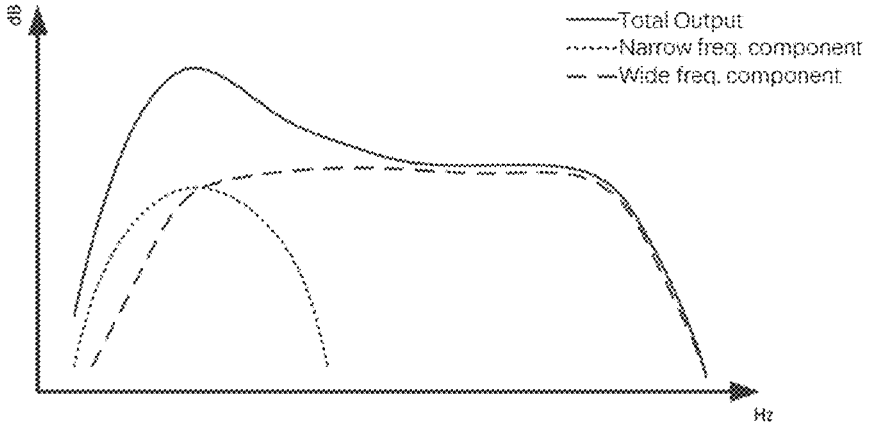
FIG. 36 shows the amplitude-frequency characteristics of a sound-output device according to some embodiments of the present application.

FIG. 36 illustrates another amplitude-frequency characteristic of a sound-output device provided in accordance with some embodiment of the present application. As shown in the figure, for example, the bone-conducted sound wave and the air-conducted sound wave may contain the same frequency component, which may have the technical effect of enhancing a certain frequency band.

In some embodiments, the bone-conducted sound wave (vibration) and the air-conducted sound wave (sound) may contain the same frequency component in the medium-low frequency band, and the cooperation of the two may allow the medium-low frequency output greater than that of the medium-high frequency. The hearing threshold/equal-loudness contour of the human ear is characterized by high mid-low frequency and low medium-high frequency, that is, the human ear is more sensitive to the medium-high frequencies. The above-mentioned output model in which the medium-low frequency output is greater than with that of the medium-high frequency can compensate for the weakening effect of the mid-low frequency sound caused by the human ear hearing threshold, so that the frequency bands heard by the human ear are balanced.

In some embodiments, the bone-conducted sound wave may include a low frequency portion of the target frequency range, and the bone-conducted sound wave may be superimposed with the air-conducted sound wave such that the output of a sound-output device at the medium-low frequency is greater than that at the medium-high frequency.

In some embodiments, the air-conducted sound wave may include a medium-low frequency band component, and the bone-conducted sound wave may include a component of a wider frequency band than that of the air-conducted sound wave. Accordingly, the bone-conducted may be employed to hear the sound with enhanced medium-low frequency component and improved sound quality, meanwhile the strong mechanical vibration at the medium-low frequency band is not increased, so as to ensure the comfort and safety.

In some embodiments, the bone-conducted sound wave may include a medium-low frequency band component, and the air-conducted sound wave may include a component of a wider frequency band than that of the bone-conducted sound wave; accordingly, by appropriately enhancing the medium-low frequency vibration, a user is allowed to receive the sound through both tactile and auditory ways, so as to improve the user's experience.

In some embodiments, the air-conducted sound wave may include a medium frequency portion of the target frequency range, the bone-conducted sound wave may include a low frequency portion and a medium frequency portion of the target frequency range, thus the bone-conducted sound wave is allowed to cover a wider range of frequency than the air-conducted sound wave.

Figure 37:
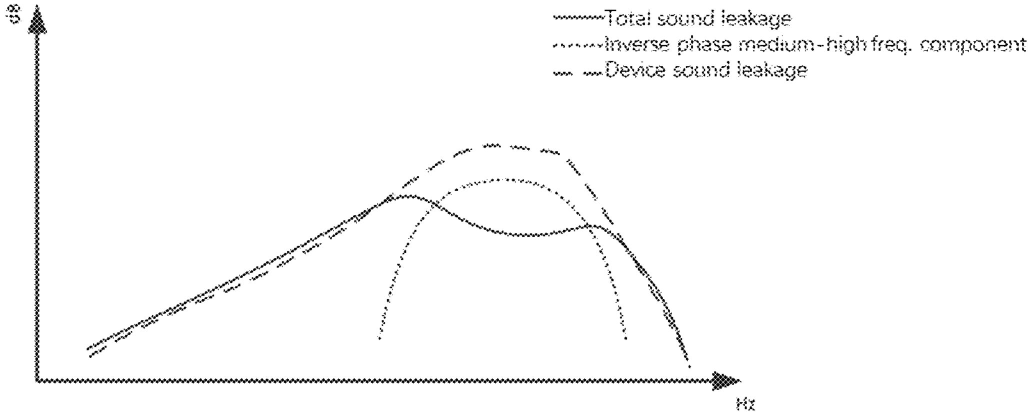
FIG. 37 shows the amplitude-frequency characteristics of a sound-output device according to some embodiments of the present application.

FIG. 37 illustrates another amplitude-frequency characteristic of a sound-output device provided in accordance with some embodiments of the present application. As shown in the figure, for example, both the air-conducted sound wave and the bone-conductive sound wave contains the same frequency component in the medium-high frequency band. This same frequency component may be a silencing frequency sound wave, that is, when the same frequency component is opposite in phase in the air-conducted sound wave and the bone-conductive sound wave, the weakening of medium-high frequency leakage is resulted. In addition, when the phase of same frequency component in phase in the air-conducted sound wave and the bone-conductive sound wave are the same, the enhancement of the medium-high frequency leakage can be achieved.

In some embodiments, the air-conducted sound wave may include a medium-high frequency component, and the bone-conducted sound wave may include a component of a wider frequency band than that of the air-conducted sound wave. In this way, the air-conducted sound wave may be used as a sound source of inverse-phase cancellation to offset the medium-high frequency band leakage caused by a bone-conducted device.

In some embodiments, the air-conducted sound wave and the bone-conducted sound wave may include a common sound wave of sound cancellation. In this case, the air-conducted sound wave may include the medium and high frequency portions in the target frequency range, and the bone-conducted sound wave may cover a wider frequency range than the air-conducted sound wave.

Figure 38:
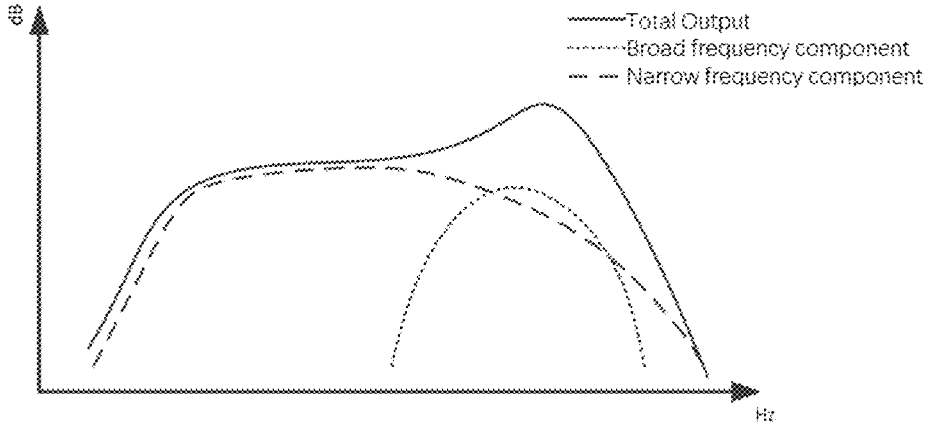
FIG. 38 shows the amplitude-frequency characteristics of a sound-output device according to some embodiments of the present application.

FIG. 38 shows another amplitude-frequency characteristic of a sound-output device provided in accordance with some embodiments of the present application.

In some embodiments, the bone-conducted sound wave may include the medium-high frequency band component, and the air-conducted sound wave may include a component of a wider frequency band than that of the bone-conducted sound wave, which may be able to enhance the sound in the medium-high frequency band. In particular, for a specific air-conducted open binaural solution, the bone-conducted sound wave may be used to compensate for the deficiency of the air-conducted sound wave in the medium-high frequency band (such as the deficiency caused by the acoustic structure, and the deficiency in the medium-high frequency band caused by the vibration division).

In some embodiments, the air-conducted sound wave may include a medium frequency portion and a high frequency portion within the target frequency range, the bone-conducted sound wave may include a medium frequency portion in the target frequency range, and the air-conducted sound wave may cover a wider frequency range than the bone-conducted sound waves.

In some embodiments, the output of the sound (air-conducted) and the vibration (bone-conducted) may be performed by separate modules/devices. In this case, in addition to the corresponding signal processing and the characteristics of the individual modules/devices, other factors may also affect the final output, such as the location of the modules/devices, the interaction/impact between the modules/devices and the like.

For the sound output modules/devices (for example, an air-conducted speaker), the boundary conditions of the positions where they are located may affect the output of the modules/devices. Taking the sound output module placed near the human head as an example, the output sound may be affected by the boundary conditions, such as the human head shape, facial features, and the auricle.

Figure 39:
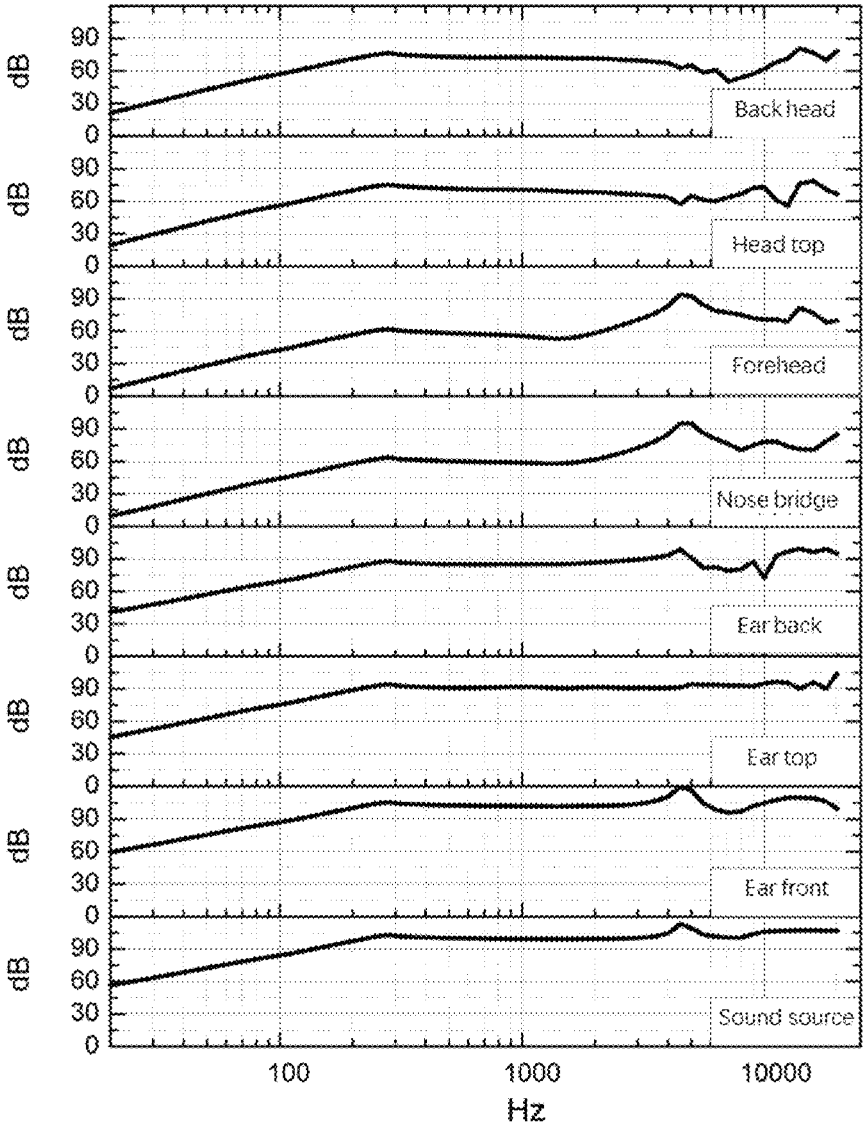
FIG. 39 shows the amplitude-frequency characteristics of the sounds of a sound output module provided at different positions of the head according to some embodiments of the present application.

FIG. 39 shows the amplitude-frequency characteristics of the sounds of a sound output module provided at different positions of the head according to some embodiments of the present application. As shown in the figure, the sound output from the sound output module placed at different positions near the human head may be affected by the above-mentioned boundary conditions, which cause the sound transmitted to the human ear is different. The sound output from the sound source is flat in various frequency bands, but when the sound source is placed at different positions on the head, the sound transmitted to the ear will be affected by different boundaries on the sound transmission path, resulting in variations of the sound transmitted to the ear. As a result, the sound transmitted to the ear may have changes in the peaks and troughs within the medium-high frequency band.

In some embodiments, when a sound-output device is worn by a user, one or more air-conducted speakers of the sound-output device may be located behind the head, on top of the head, on the forehead, on the nose bridge, behind the ear, on top of the ear, and/or in front of the ear.

The sound diffused into the surrounding space from a sound source/the sound field/leakage in the surrounding space may also be different due to the influence of different boundaries.

Figure 40:
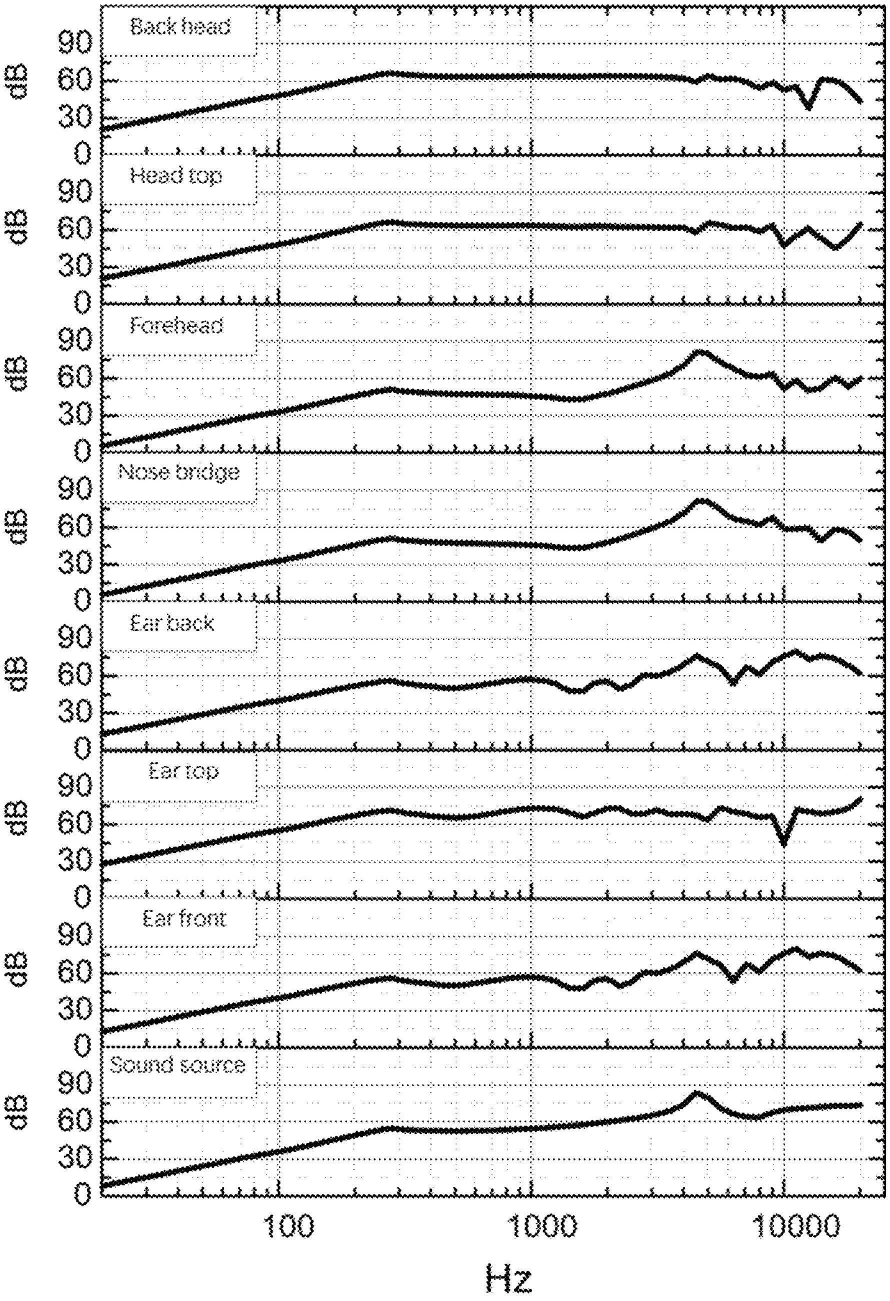
FIG. 40 shows the amplitude-frequency characteristics of the sound leakage of a sound output module according to some embodiments of the present application.

FIG. 40 illustrates the amplitude-frequency characteristics of the sound leakage of a sound output module according to some embodiments of the present application. As shown in the figure, for the sound leakage spectra of a sound source placed under an unobstructed free field condition, when the sound source is placed at different positions on the head, the sound leakage spread to the outside may also be affected by different boundaries, resulting in changes in the sound leakage spectrum. In addition, these changes may primarily occur in the medium-high frequency band.

For a vibration output module/device (for example, a vibration speaker), the modules/devices may be in contact with a user at different locations due to its need to contact the user in order to transmit vibration, which may bring various vibration experiences to the user. The vibration output by the modules/devices may be affected by the tissue mechanical properties at the contact positions, and affected by the pressure and pressure distribution on the contact surface, and may also be affected by the vibration direction.

Some vibration output modules/devices may output sound to the surrounding space during operation, and the output sound is also affected by surrounding boundary conditions.

Figure 41:
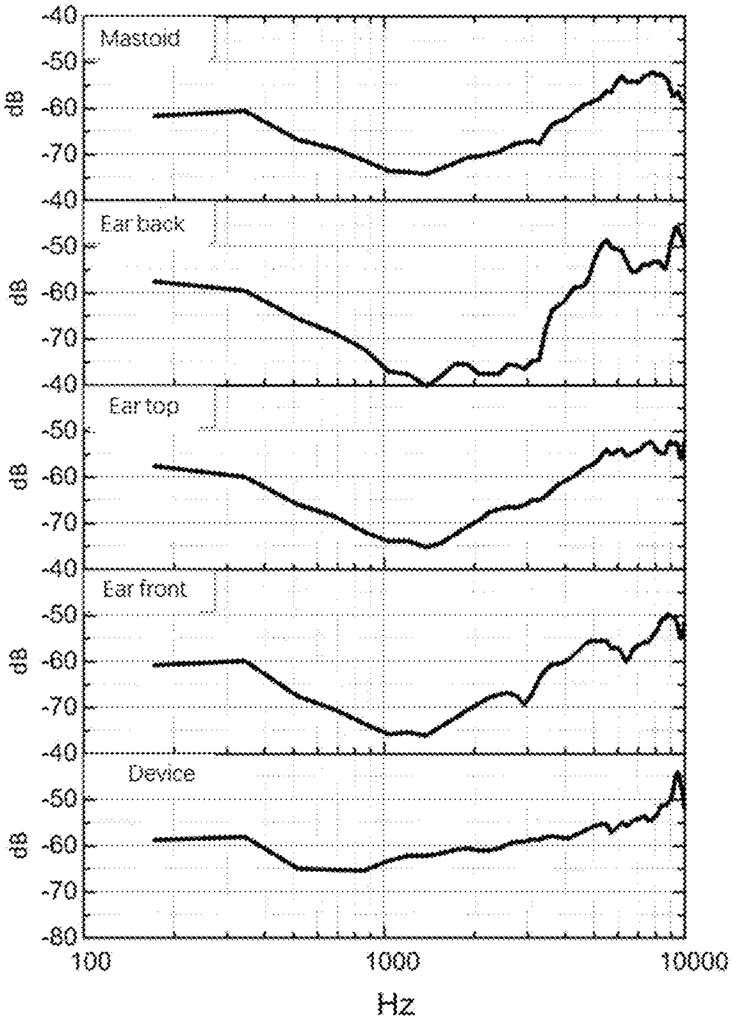
FIG. 41 shows the amplitude-frequency characteristics of the sound leakage of a vibration output module according to some embodiments of the present application.

FIG. 41 illustrates the amplitude-frequency characteristics of the sound leakage of a vibration output module according to some embodiments of the present application. For a vibration output module/device that is attached to different positions of the head, as shown in the figure, the sound diffused into the surrounding space from a sound source/the sound field/leakage in the surrounding space at different positions may also be different. Compared with the leakage of the vibration output module/device under the condition of free field without body attachment, when the vibration output module/device is attached to different positions of the head, the sound leakage has significant changes in the medium and high frequency bands, that is, the sound leakage is reduced in the medium frequency band, but increased in the high frequency band.

In some embodiments, one or more vibration speakers of a sound-output device may be located on a user's mastoid, back side of the head, top of the head, forehead, nose bridge, back side of the ear, top of the ear and/or front of the ear when the sound-output device is worn by the user.

The output of various modules/devices may interact/interference with each other; the user's experience will be the final result of the combined actions of these modules/devices, and the relevant factors among these modules/devices may affect their interactions.

The spacing between the modules/devices may affect the amplitude and phase of the output from one module/device to another. It may also affect the amplitude and phase output by one module/device's to somewhere in the space, and ultimately affect the overall output.

Figure 42:
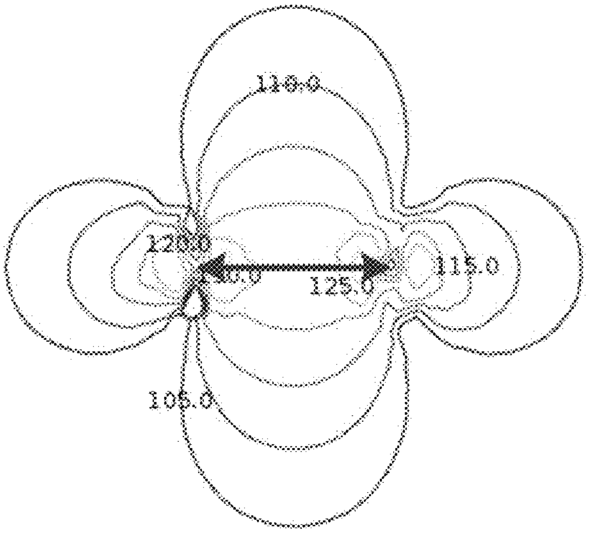
FIG. 42 is a schematic diagram showing the positional relationship of two dipole sound sources according to some embodiments of the present application.
Figure 43:
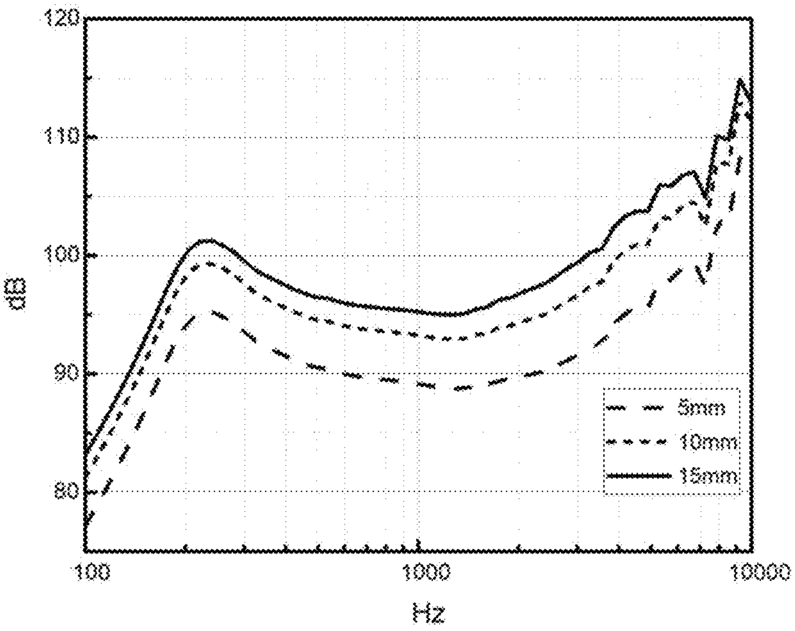
FIG. 43 shows the amplitude-frequency characteristics of two dipole sound sources of different distances according to some embodiments of the present application.

FIG. 42 is a schematic diagram showing the positional relationship of two dipole sound sources according to some embodiments of the present application. FIG. 43 illustrates the amplitude-frequency characteristics of two dipole sound sources with different distances therebetween provided in accordance with some embodiments of the present application. As shown in the figure, taking two dipole sound sources with a certain distance as an example, where the sound sources have the same amplitude but inverse phase. When the distance between the two sound sources changes, the sound energy/volume output to the outside may also change. In this case, as the distance between the two sound sources increases, the volume of the sound output to the outside will increase.

The amplitude of each module/device may directly affect the amplitude of its output to somewhere in the space, which further affects the interaction results of the modules/device outputs. At the same time, since the output of each module/device will form a specific sound field distribution in space, the influences of the amplitudes of the modules/devices at different locations in the space may also be different.

Figure 44:
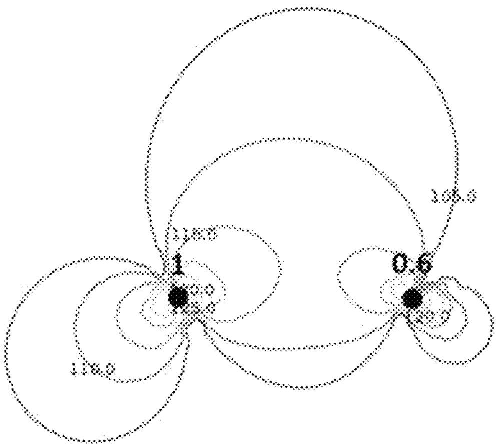
FIG. 44 is a schematic diagram showing the positional relationship of two dipole sound sources according to some embodiments of the present application.
Figure 45:
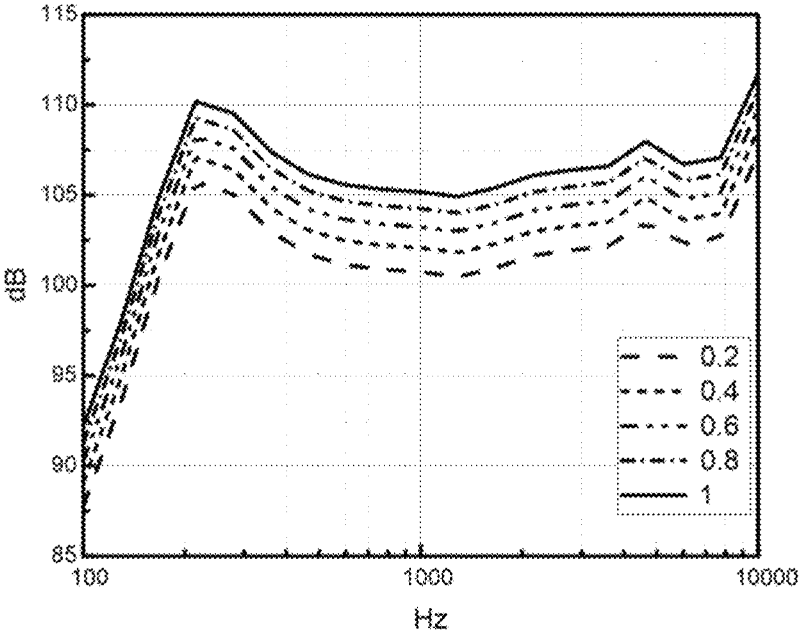
FIG. 45 shows the normal amplitude-frequency characteristics of two dipole sound sources at different amplitude ratios according to some embodiments of the present application.
Figure 46:
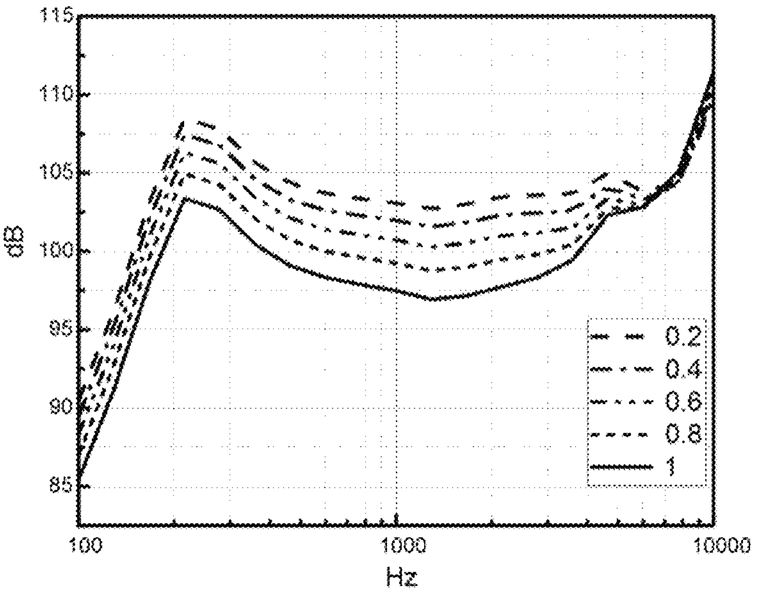
FIG. 46 shows the axial amplitude-frequency characteristics of two dipole sound sources at different amplitude ratios according to some embodiments of the present application.

FIG. 44 is a schematic diagram showing the positional relationship of two dipole sound sources according to some embodiments of the present application. FIG. 45 illustrates the normal amplitude-frequency characteristics of two dipole sources at different amplitude ratios, provided in accordance with some embodiments of the present application. FIG. 46 illustrates the axial amplitude-frequency characteristics of two dipole sources at different amplitude ratios, as provided in accordance with some embodiments of the present application. As shown in the figures, taking two dipole sound sources with a certain distance, a relative angle and an inverse phase as an example, when the amplitude of one sound source changes relative to the amplitude of the other one, the sound field generated in the space may also change. In this case, at the position of the midperpendicular (normal direction) of a line connecting these two sound sources, as the ratio of the amplitude of one sound source to that of the other sound source increases, the sound pressure level at that position may also increase. At the position of a line connecting these two sound sources, as the ratio of the amplitude of one sound source to that of the other sound source increases, the sound pressure level at that position may decrease.

The phase of each module/device may directly affect the phase of its output to somewhere in the space, which may further affect the interaction results between modules/device outputs.

Figure 47:
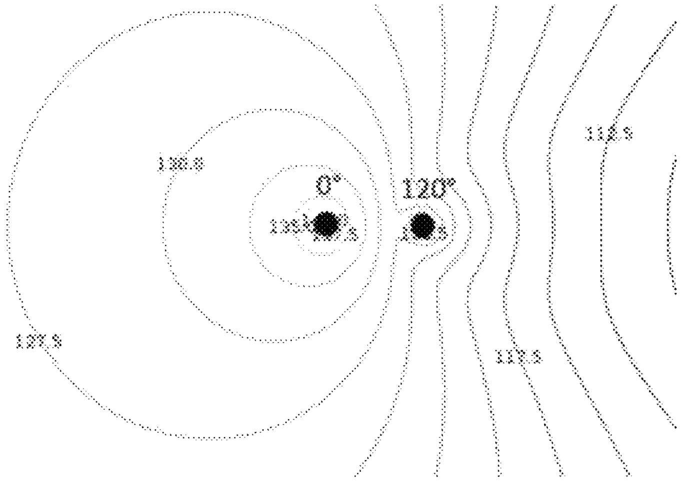
FIG. 47 is a schematic diagram showing the positional relationship of two monopole sound sources according to some embodiments of the present application.
Figure 48:
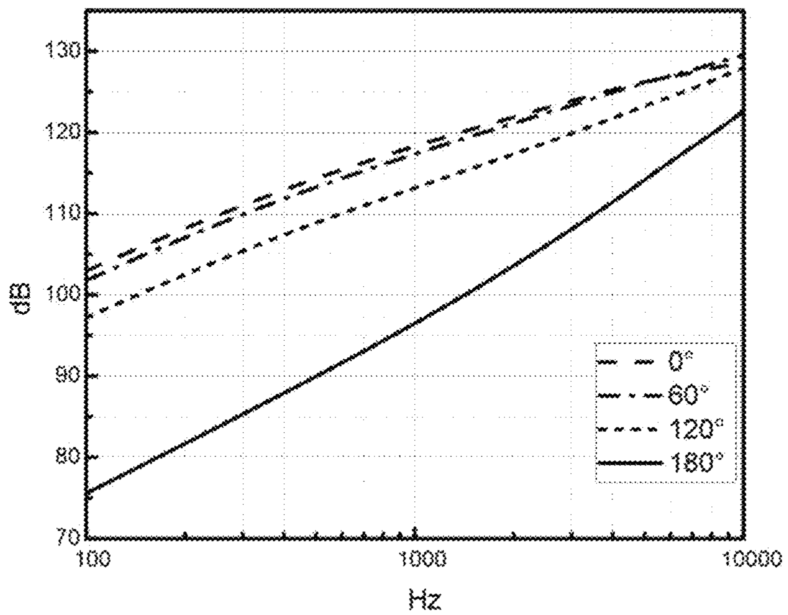
FIG. 48 shows the amplitude-frequency characteristics of two monopole sound sources at different phase differences according to some embodiments of the present application.

FIG. 47 is a schematic diagram showing the positional relationship of two monopole sound sources according to some embodiments of the present application. FIG. 48 illustrates the amplitude-frequency characteristics of two monopole sound sources at different phase differences provided in accordance with some embodiments of the present application. As shown in the figures, taking two monopole sources a certain distance with the same amplitude as an example, when the phase difference between the two sources changes, their energy/volume output to the outside may also change. When the phase difference between the two sound sources gradually approaches 180 degrees, the output energy/volume gradually becomes smaller (the sound pressure becomes smaller). In addition, the reduction in the low frequency portion may be greater than that in the high frequency portion.

The output of some modules/devices may have the spatial distribution anisotropy in their directivity/output. Therefore, the spatial location and posture of the module/device having such feature may affect their sound field distribution in the space, which may further affect the overall output.

Figure 49:
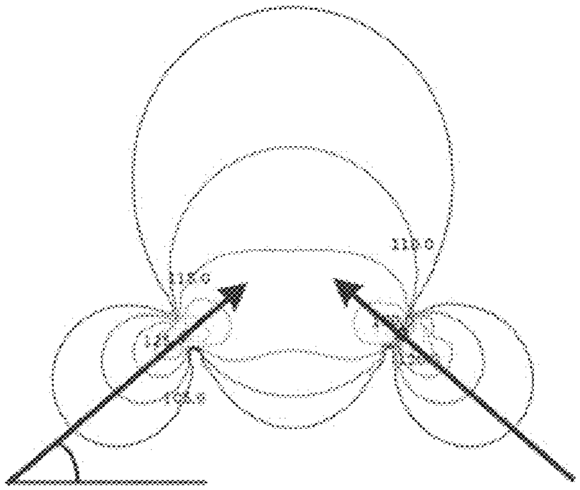
FIG. 49 is a schematic diagram showing the positional relationship of two dipole sound sources according to some embodiments of the present application.
Figure 50:
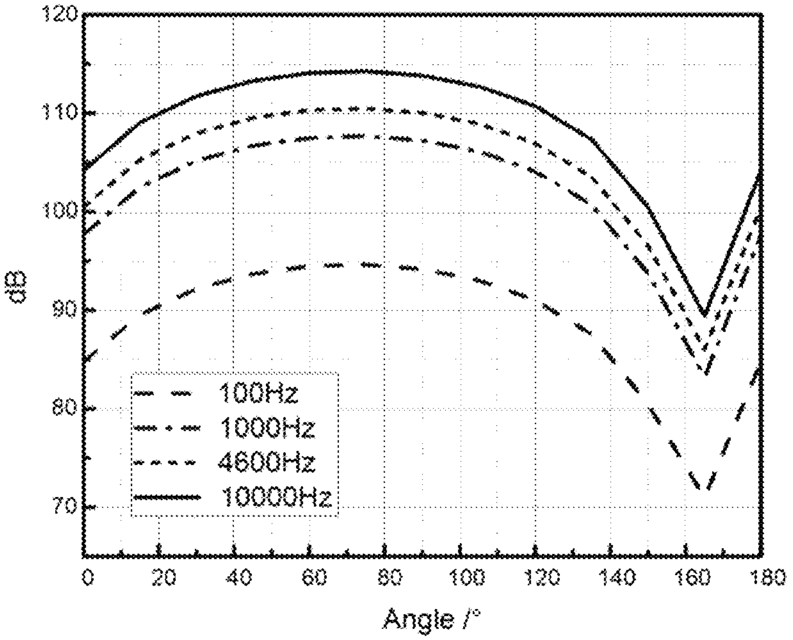
FIG. 50 shows a relationship between a normal angle and the amplitude of two dipole sound sources at different frequencies according to some embodiments of the present application.
Figure 51:
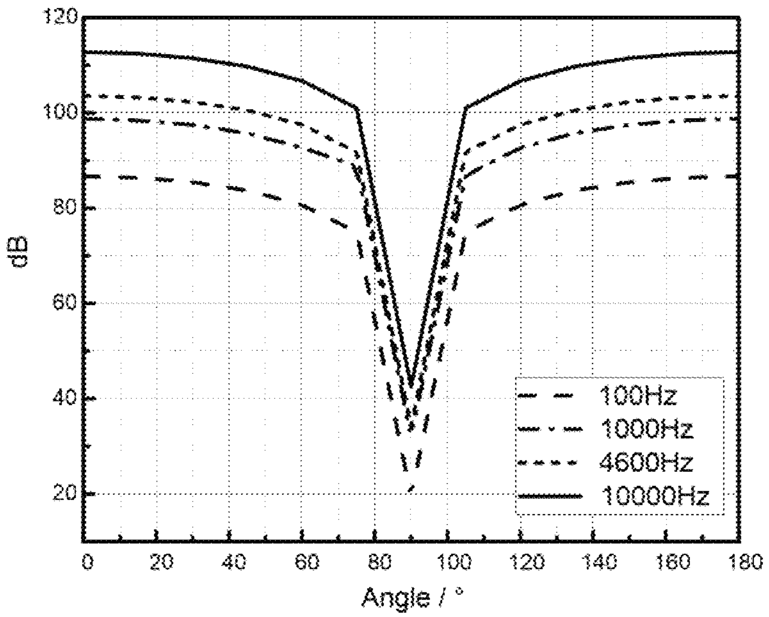
FIG. 51 shows a relationship between an axial angle and the amplitude of two dipole sound sources at different frequencies according to some embodiments of the present application.

FIG. 49 is a schematic diagram showing the positional relationship of two dipole sound sources according to some embodiments of the present application. FIG. 50 shows a relationship between a normal angle and the amplitude of two dipole sound sources at different frequencies according to some embodiments of the present application. FIG. 51 shows a relationship between an axial angle and the amplitude of two dipole sound sources at different frequencies according to some embodiments of the present application. As shown in the figures, taking two dipole sound sources with certain distance and inverse phase as an example, when the axial directions of the two sound sources are different, their sound outputs may also be different. The angle formed between the polar axis direction and the connection between the two sound sources is the rotation angle, and the rotation angles of the two sound sources are complementary. As the rotation angle changes, the sound pressure level/volume at different locations in the space may also be different. At the midperpendicular position (normal direction) of the connection between the two sound sources, the sound pressure level has the maximum value at a rotation angle of about 80 degrees, and has the minimum value at about 165 degrees. At a position on an extension line (axial direction) of the connection between the two sound sources, the sound pressure level has the minimum value at a rotation angle of about 90 degrees.

When the modules/devices have a special spatial arrangement, a sound field with a special distribution may be produced.

Figure 53:
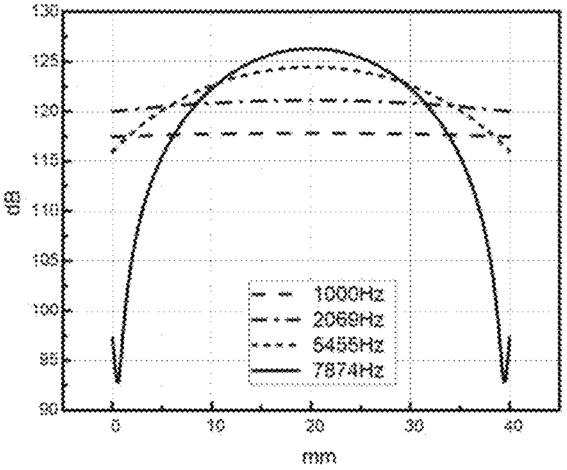
FIG. 53 shows the amplitude distributions of five monopole sound sources at different frequencies according to some embodiments of the present application.
Figure 52:
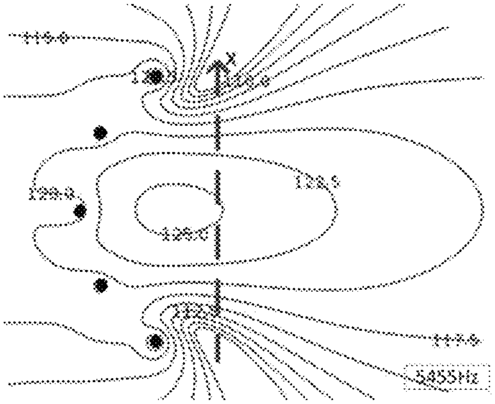
FIG. 52 is a schematic diagram showing the positional relationship of five monopole sound sources according to some embodiments of the present application.

FIG. 52 is a schematic diagram showing the positional relationship of five monopole sound sources according to some embodiments of the present application. FIG. 53 shows the amplitude distributions of five monopole sound sources at different frequencies according to some embodiments of the present application. As shown in the figures, taking five monopole sound sources arranged at equal intervals according to a planar quadratic curve, a focus of the sound field may be generated near the focus of the quadratic curve, where the sound pressure level/volume will be extremely large. For different frequency signals, the effect of such sound focusing may be different; as the frequency increases, the focusing effect becomes more pronounced. This focusing effect makes the output of the entire module become spatially directional.

In the case where the modules/devices have a specific spatial arrangement, the output phase difference between these modules/devices may affect the state of the entire sound field generated, which may further affect the spatial directivity of the entire module output.

Figure 55:
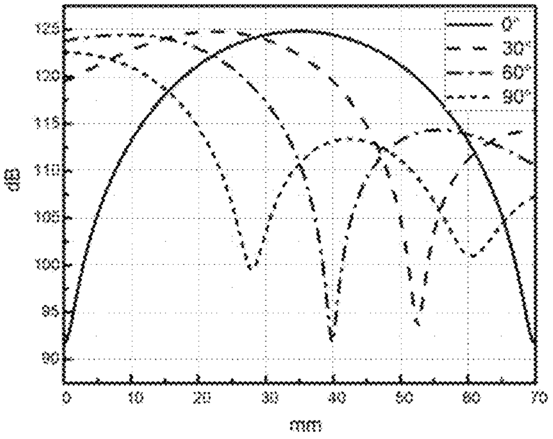
FIG. 55 shows the amplitude distributions of five monopole sound sources at different phase differences according to some embodiments of the present application.
Figure 54:
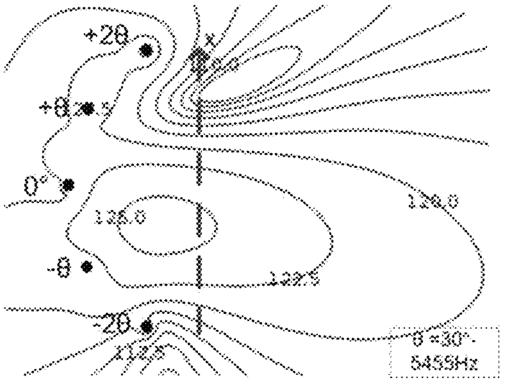
FIG. 54 is a schematic diagram showing the positional relationship of five monopole sound sources according to some embodiments of the present application.

FIG. 54 is a schematic diagram showing the positional relationship of five monopole sound sources according to some embodiments of the present application. FIG. 55 shows the amplitude distributions of five monopole sound sources at different phase differences according to some embodiments of the present application. As shown in the figures, five monopole sound sources are equally spaced along a quadratic curve, and the output phases of these sound sources sequentially increase (or decrease) by an angle θ along the quadratic curve distribution. When the angle θ changes, the focus position of the sound field may also change; as the angle θ increases from 0 degree to 90 degrees, the position of the sound field focus moves in the direction of phase sequentially decreasing.

In the case where the modules/devices have a specific spatial arrangement, the output amplitudes of the modules/devices may affect the state of the entire sound field, which may further affect the spatial directivity of the entire module output.

Figure 57:
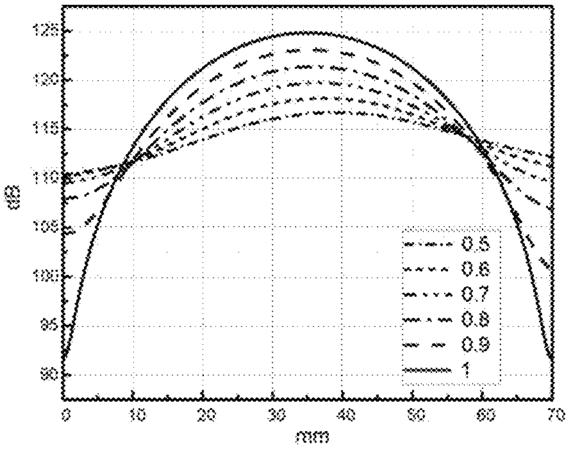
FIG. 57 shows the amplitude distributions of five monopole sound sources at different amplitude ratios according to some embodiments of the present application.
Figure 56:
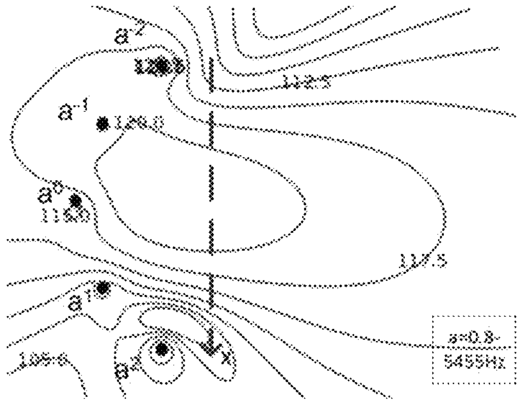
FIG. 56 is a schematic diagram showing the positional relationship of five monopole sound sources according to some embodiments of the present application.

FIG. 56 is a schematic diagram showing the positional relationship of five monopole sound sources according to some embodiments of the present application. FIG. 57 shows the amplitude distributions of five monopole sound sources at different amplitude ratios according to some embodiments of the present application. As shown in the figures, five monopole sound sources are equally spaced along a quadratic curve, and the output amplitudes of the sound source increase (or decrease) in proportion at a ratio a along the quadratic curve distribution. When the ratio a changes, the sound focusing may also changes; the smaller the ratio a, the bigger the difference in amplitude between the modules/devices, and the poorer the focusing effect. In addition, the focus position will move toward the sound source of large amplitude. Moreover, when the amplitude ratio a changes, the direction of the output of the entire module may change, and it will deviate toward the sound source of large amplitude.

In some embodiments, the sound-output device may include a plurality of air-conducted speakers arranged equally spaced along a quadratic curve. In some embodiments, the sound-output device may include a plurality of vibration speakers equally spaced along a quadratic curve.

Figure 58:
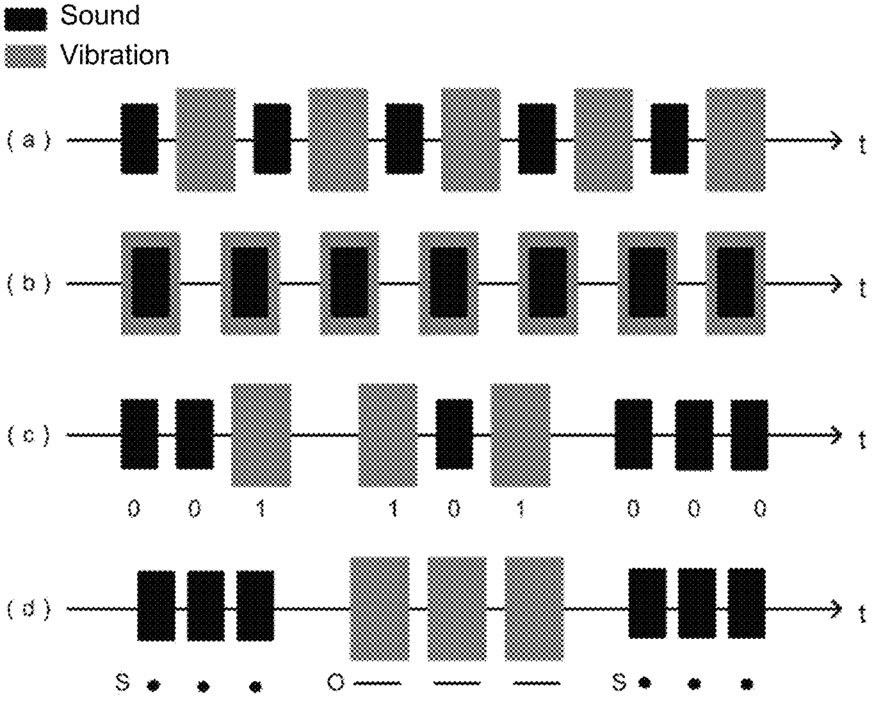
FIG. 58 shows various combinations of bone-conducted sound waves and air-conducted sound waves provided in accordance with some embodiments of the present application.

FIG. 58 shows various combinations of bone-conducted sound waves and air-conducted sound waves provided in accordance with some embodiments of the present application.

Vibration and sound may affect people's senses of touch and hearing, respectively, and their effect would be stronger than that of touch or hearing alone, thereby producing a unique effect. As shown in FIG. 58(*a*), it is an operation mode in which vibration and sound are alternately output, which may function as an enhanced prompt or alarm. Compared with the vibration or sound prompt/alarm alone, this mode of alternating vibration and sound may stimulate the sense of touch and hearing, and thus achieving a stronger prompting effect. In some embodiments, the vibration may be within a frequency band of 1 Hz to 500 Hz and the sound may be within a frequency band of 1 kHz to 5 kHz. As shown in FIG. 58(*b*), it is an operation mode in which vibration and sound are output simultaneously, which may simultaneously stimulate people's sense of touch and hearing, and also has a strong prompting effect. It may also be set that the vibration changes as the sound changes (or the sound changes as the vibration changes), thereby enhancing the human body's feelings through the senses of both touch and hearing. For example, in the case of playing a game or watching a movie, the explosion sound may be accompanied by a corresponding vibration signal to enhance a user's feelings. In a scenario of sound source positioning, the mode of the vibration may change as the position of sound source changes (for example, changing the amplitude or frequency of the vibration) so as to enhance the sound source positioning. In a VR/AR device, the mode of vibration may change along with visual and auditory changes, thereby enhancing the immersion feeling by the combination of vision, hearing, and touch. Since the vibration and sound respectively trigger different susceptors of a user, the two sensations (tactile and auditory) may have obvious distinguishing properties; accordingly, the two different sensations of touch and hearing may be used to represent different states to deliver the information. As shown in FIG. 58(*c*), the sound state (excited hearing) may be expressed as the state "0", the vibration state (excited tactile sense) may be expressed as the state "1", and the intermittent output of sound and vibration can form a string of binary information to deliver the information. As shown in FIG. 58(*d*), the sound state and the vibration state may be respectively represented by "." and "–" in the Moss code, and information may be transmitted through the Morse code.

Figure 59:
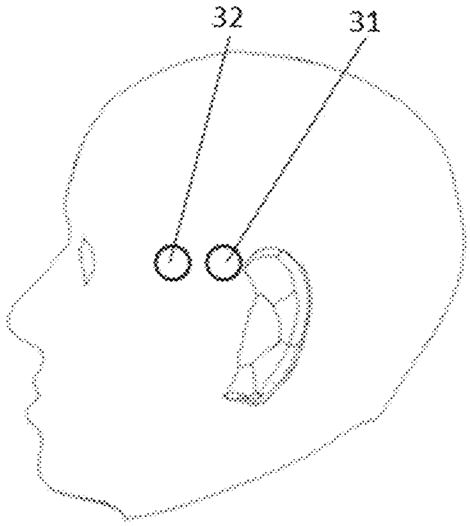
FIG. 59 shows the positions of a vibration speaker and an air-conducted speaker at a user's head according to some embodiment of the present application.
Figure 60:
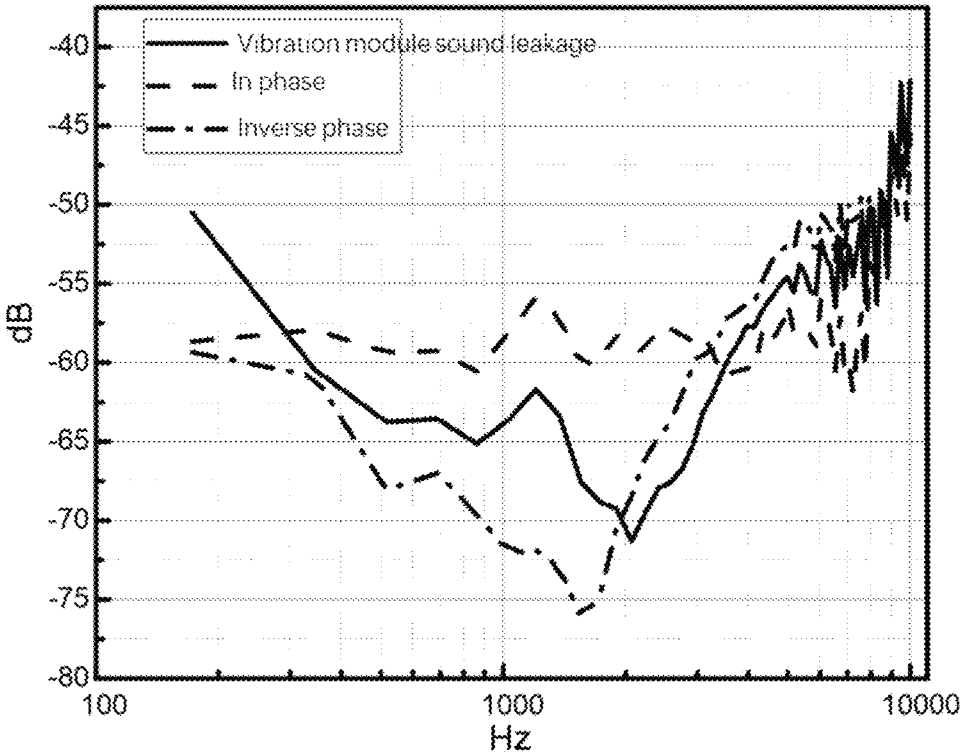
FIG. 60 shows the amplitude-frequency characteristics of the sound leakage of a vibration speaker according to some embodiments of the present application.
Figure 61:
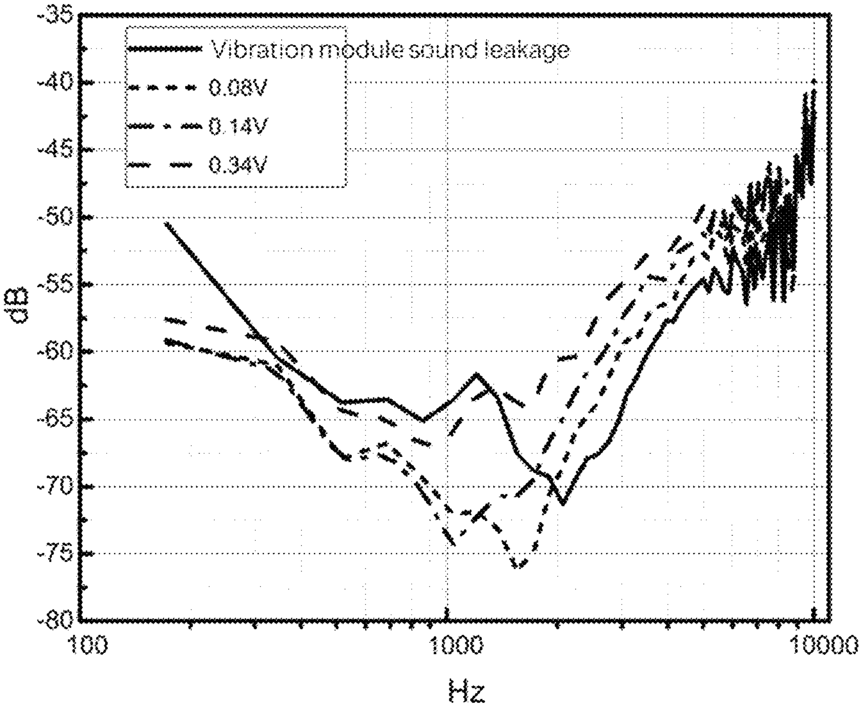
FIG. 61 shows the amplitude-frequency characteristics of the sound leakage of a vibration speaker provided at different powers according to some embodiments of the present application.

FIG. 59 shows the positions of a vibration speaker and an air-conducted speaker at a user's head according to some embodiment of the present application. FIG. 60 shows the amplitude-frequency characteristics of the sound leakage of a vibration speaker according to some embodiments of the present application. FIG. 61 shows the amplitude-frequency characteristics of the sound leakage of a vibration speaker provided at different powers according to some embodiments of the present application. As shown in the figures, the vibration output module (for example, a vibration speaker) outputs vibration by being attached to a human body, or sound may be output by way of bone-conducted. At the same time, because the vibration output module drives the surrounding air to vibrate, air-conducted sound leakage may occur, which will affect the user experience.

Hence, a sound output module may be added on the basis of the vibration output module, thus the air-conducted sound wave outputted by the sound output module may interact with the leaked air-conducted sound wave generated by the vibration output module to reduce the sound leakage.

The effect of sound leakage may also be adjusted by adjusting the phase and amplitude of the sound output module (for example, an air-conducted speaker). Taking the case where the vibration output module is placed in front of the ear as an example, the phase of the sound output module may be adjusted such that the phase of the sound output by the sound output module is the same as that of the sound leakage from the vibration module. As a result, the sound leakage of the entire device is enhanced. In another case, when the phase of the sound output module is adjusted so that its sound output has an inverse phase with respect to the sound leakage of the vibration module, the sound leakage of the entire device will be reduced. As further affected by the distance between the two modules, the sound leakage reduction may only occur in certain frequency bands.

By adjusting the signal amplitude of the sound output module, the amplitude of the sound output by the sound output module may also be adjusted, thereby affecting the sound leakage. If the output sound amplitude is too small, the sound cancellation effect is not significant. If the output sound amplitude is too large, the output sound dominates the portion of the sound leakage. Accordingly, it cannot significantly reduce the sound leakage. When the amplitude of the output sound is equal to that of the leaked sound, there will be a more significant sound leakage reduction effect.

In some embodiments, an augmented reality (AR) device/virtual reality (VR) device may include a sound-output device as described above. For example, one or more sound and vibration output modules may be provided on the AR/VR device to provide audible and tactile input to a user. In combination with the visual input of an AR/VR device, the user may have an enhanced immersion feeling. In particular, a set of sound and vibration output modules may be provided in each of the left and right ears of the user, which may provide a stereo sound effect to the user while providing the vibration of a corresponding mode. Moreover, an array of sound and vibration output modules may be provided to the eyecup or headband of an AR/VR device to achieve directional delivery of the sound; a vibration output module array may also be used for spatial positioning prompts. For example, the output of the sound output module array may be controlled based on user movement and rotation signals obtained by sensors (three-axis accelerometer, gyroscope, etc.) to allow the user to position by hearing. The vibration mode of the vibration output module array may also be controlled to prompt the user for distance, angle, velocity and the like.

What is claimed is:

1. A sound-output device, comprising:

a vibration speaker configured to generate a bone-conducted sound wave;

an air-conducted speaker coupled to the vibration speaker through a mechanical structure and configured to generate an air-conducted sound wave; and a signal processing module configured to generate a control signal, wherein the vibration speaker includes a vibration assembly electrically connected to the signal processing module to receive the control signal, and generate the bone-conducted sound wave based on the control signal, and the air-conducted speaker includes a housing coupled to the vibration assembly to generate the air-conducted sound wave under an actuation of the vibration assembly;

the signal processing module includes:

a bone-conducted signal processing circuit configured to generate a bone-conducted control signal, and an air-conducted signal processing circuit configured to generate an air-conducted control signal, the bone-conducted signal processing circuit includes a full frequency signal processing module configured to generate a bone-conducted output signal based on an initial sound wave signal, the air-conducted signal processing circuit includes:

a frequency divider module configured to decompose the initial sound signal into a high frequency signal component and a low frequency signal component, a high frequency signal processing module coupled to the frequency divider module and configured to generate a high frequency output signal based on the high frequency signal component, and a low frequency signal processing module coupled to the frequency divider module and configured to generate a low frequency output signal based on the low frequency signal component.

2. The sound-output device according to claim 1, wherein the vibration speaker includes a first vibration assembly electrically connected to the bone-conducted signal processing circuit to receive the bone-conducted control signal, and generate the bone-conducted sound wave based on the bone-conducted control signal; and the air-conducted speaker includes a second vibration assembly electrically connected to the air-conducted signal processing circuit to receive the air-conducted control signal and generate the air-conducted sound wave based on the air-conducted control signal.

3. The sound-output device according to claim 2, wherein the first vibration assembly includes:

a magnetic circuit system configured to generate a first magnetic field, a vibration plate connected to the housing via an elastic member, and a first coil connected to the vibration plate and electrically connected to the bone-conducted signal processing circuit to receive the bone-conducted control signal and generate a second magnetic field based on the bone-conducted control signal, the first magnetic field interacting with the second magnetic field to cause the vibration plate to generate the bone-conducted sound wave; and the second vibration assembly includes:

a membrane connected to the housing, and a second coil connected to the membrane and electrically connected to the air-conducted signal processing circuit to receive the air-conducted control signal and generate a third magnetic field based on the air-conducted control signal, the first magnetic field interacting with the third magnetic field to cause the membrane to generate the air-conducted sound wave.

4. The sound-output device according to claim 3, wherein the magnetic circuit system is connected to the housing via an elastic member.

5. The sound-output device according to claim 3, wherein the housing includes a sound hole and a tuning hole;

the air-conducted speaker includes a first tuning mesh and a second tuning mesh;

the first tuning mesh covers the sound hole, and the second tuning mesh covers the tuning hole.

6. The sound-output device according to claim 1, wherein the bone-conducted signal processing circuit includes a first power amplifier configured to amplify the bone-conducted output signal to the bone-conducted control signal;

the air-conducted signal processing circuit includes:

a second power amplifier configured to amplify the high frequency output signal into a high frequency air-conducted control signal; and a third power amplifier configured to amplify the low frequency output signal into a low frequency air-conducted control signal.

7. The sound-output device according to claim 6, wherein the air-conducted speaker includes:

a high frequency air-conducted speaker configured to generate a high frequency air-conducted sound wave based on the high frequency control signal; and a low frequency air-conducted speaker configured to generate a low frequency air-conducted sound wave based on the low frequency control signal.

8. The sound-output device according to claim 1, wherein the air-conducted signal processing circuit includes a signal synthesis module coupled to the high frequency signal processing module and the low frequency signal processing module, and configured to synthesizing the high frequency output signal and the low frequency output signal to an air-conducted output signal.

9. The sound-output device according to claim 8, wherein the bone-conducted signal processing circuit includes a first power amplifier configured to amplify the bone-conducted output signal to the bone-conducted control signal; and the air-conducted signal processing circuit includes a second power amplifier configured to amplify the air-conducted output signal to the air-conducted control signal.

10. The sound-output device according to claim 9, wherein the signal processing module further includes:

a microphone configured to collect an ambient noise signal;

a noise signal processing module coupled to the microphone and the air-conducted signal processing circuit, and configured to perform noise reduction for the air-conducted output signal based on the ambient noise signal.

11. The sound-output device according to claim 9, wherein the signal processing module further includes:

a first microphone configured to collect an ambient noise signal;

a noise signal processing module coupled to the first microphone, and configured to generate a noise reduction signal based on the ambient noise signal; and a fourth power amplifier coupled to the noise signal processing module, and configured to amplify the noise reduction signal;

the air-conducted speaker further includes:

an auxiliary air-conducted speaker coupled to the fourth power amplifier, and configured to output an air-conducted sound wave based on the amplified noise reduction signal.

12. The sound-output device according to claim 11, wherein the signal processing module further includes:

a second microphone configured to collect a sound signal of an area to be noise-reduced and generate an error signal based on the sound signal;

a noise signal feedback module coupled to the second microphone and the noise signal processing module, and configured to generate a feedback signal based on the error signal, wherein the noise signal processing module is configured to generate a noise reduction signal according to the ambient noise signal and the feedback signal.

13. The sound-output device according to claim 9, wherein the signal processing module further includes:

a microphone configured to collect a sound signal of an area to be noise-reduced and generate an error signal based on the sound signal; and a noise signal processing module coupled to the microphone and the air-conducted signal processing circuit, and configured to generate a feedback signal based on the error signal, the feedback signal performing noise reduction with the air-conducted output signal.

* * * * *